(12) United States Patent
Abbott et al.

(10) Patent No.: US 6,824,837 B2
(45) Date of Patent: Nov. 30, 2004

(54) LIQUID CRYSTAL SWITCHING MECHANISM

(75) Inventors: Nicholas Lawrence Abbott, Madison, WI (US); Yan-Yeung Luk, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 128 days.

(21) Appl. No.: 10/234,449

(22) Filed: Sep. 4, 2002

(65) Prior Publication Data

US 2003/0071949 A1 Apr. 17, 2003

Related U.S. Application Data

(60) Provisional application No. 60/315,372, filed on Sep. 4, 2001.

(51) Int. Cl.[7] .................. C09K 19/52; C09K 19/54; C09K 19/56; C09K 19/58; G02F 1/1337
(52) U.S. Cl. .................. 428/1.1; 428/1.3; 428/1.4; 252/299.3; 252/299.4; 252/299.5; 252/299.01; 349/41; 349/123
(58) Field of Search .................. 252/299.01, 299.5, 252/299.3, 399.4; 428/1.1, 1.3, 1.4; 349/41, 123

(56) References Cited

U.S. PATENT DOCUMENTS

| | | | |
|---|---|---|---|
| 4,597,942 A | 7/1986 | Meathrel | 422/57 |
| 4,628,037 A | 12/1986 | Chagnon et al. | 436/526 |
| 4,725,669 A | 2/1988 | Essex et al. | 530/322 |
| 4,812,556 A | 3/1989 | Vahlne et al. | 530/324 |

(List continued on next page.)

FOREIGN PATENT DOCUMENTS

| | | |
|---|---|---|
| DE | 3617710 A1 | 12/1986 |
| EP | 0 284 587 | 8/1988 |
| EP | 0 345 462 | 12/1989 |
| JP | 02311822 A2 | 12/1990 |

(List continued on next page.)

OTHER PUBLICATIONS

Ennulat, R. D. et al., "Thermal Radiography Utilizing Liquid Crystals," *Molecular Crystals and Liquid Crystals*, vol. 13, pp. 149–164, 1971; published by Gordon and Breach Science Publishers (United Kingdom).

Novak, T. J. et al., "Use of Anisotropic Materials as Chemical Detectors," *Analytical Letters*, vol. 5, No. 3, pp. 187–192, 1972, published by Marcel Dekker, Inc. (New York, NY).

Poziomek, E. J. et al., "Use of Liquid Crystals as Vapor Detectors," *Mol. Cryst. Liq. Cryst.*, vol. 27, pp. 175–185, 1973, published by Gordon and Breach Science Publishers, Ltd., (Holland).

Saji, T. et al., "Reversible Formation and Disruption of Micelles by Control of the Redox State of the Head Group," *J. Am. Chem. Soc.*, vol. 107, pp. 6865–6868, 1985, published by the American Chemical Society (Washington, D.C.).

Heslot, F. et al., "Molecular Layering in the Spreading of Wetting Liquid Drops," *Nature*, vol. 338, pp. 640–642, 1989, published by Nature Publishing (New York, NY).

(List continued on next page.)

*Primary Examiner*—Shean C Wu
(74) *Attorney, Agent, or Firm*—Foley & Lardner LLP

(57) ABSTRACT

The invention provides liquid crystal switching devices, liquid crystal cells made from the switching devices, and electrooptical cells made from the switching devices. The invention further provides methods for methods for changing the orientation of a liquid crystal in a liquid crystal switching device. The liquid crystal switching devices are constructed from a redox-active material supported by a substrate and a liquid crystal having a salt dispersed therein disposed atop the redox-active material.

38 Claims, 19 Drawing Sheets

U.S. PATENT DOCUMENTS

| | | | |
|---|---|---|---|
| 5,620,850 A | 4/1997 | Bamdad et al. | 530/300 |
| 5,712,103 A | 1/1998 | Leavitt et al. | 435/7.92 |
| 5,940,201 A | 8/1999 | Ash et al. | 359/267 |
| 6,060,327 A | 5/2000 | Keen | 204/403.14 |
| 6,159,681 A | 12/2000 | Zebala | 435/4 |
| 6,171,802 B1 | 1/2001 | Woolverton et al. | 435/7.1 |
| 6,178,034 B1 | 1/2001 | Allemand et al. | 359/265 |
| 6,203,304 B1 | 3/2001 | Lopez Tonazzi et al. | 425/110 |
| 6,277,489 B1 | 8/2001 | Abbott et al. | 428/403 |
| 6,284,197 B1 | 9/2001 | Abbott et al. | 422/82.05 |
| 6,288,392 B1 | 9/2001 | Abbott et al. | 250/307 |
| 6,306,594 B1 | 10/2001 | Cozzette et al. | 435/6 |
| 6,491,061 B1 | 12/2002 | Lopez et al. | 137/599.01 |
| 6,540,939 B1 * | 4/2003 | Martin et al. | 252/299.01 |

FOREIGN PATENT DOCUMENTS

| | | | |
|---|---|---|---|
| JP | | 02311824 A2 | 12/1990 |
| JP | | 03010222 A2 | 1/1991 |
| JP | | 03039932 A2 | 2/1991 |
| JP | | 04057024 A2 | 2/1992 |
| JP | | 04057025 A2 | 2/1992 |
| JP | | 04284423 A2 | 10/1992 |
| JP | | 05134257 A2 | 5/1993 |
| JP | | 05134258 A2 | 5/1993 |
| JP | | 06175136 A2 | 6/1994 |
| JP | | 06194513 A2 | 7/1994 |
| JP | | 06194662 A2 | 7/1994 |
| WO | WO 92/08978 | | 5/1992 |
| WO | WO 99/63329 | | 12/1999 |
| WO | WO 99/64862 | | 12/1999 |
| WO | WO 01/61325 | | 8/2001 |
| WO | WO 01/61357 | | 8/2001 |

OTHER PUBLICATIONS

Pieranski P. et al., "Adsorbing–Induced Anchoring Transitions at Nematic–Liquid–Crystal–Crystal Interfaces," *Phys. Rev. A.*, vol. 40, No. 1, pp. 317–322, Jul. 1, 1989, published by the American Physical Society (Washington D.C.).

Starkey, C.A. et al. "Evaluation of the Recombigen HIV–1 Latex Agglutination Test," *J. Clin. Microbiol.*, vol. 28, No. 4, pp. 819–822, Apr. 1990, published by the American Society for Microbiology (Washington D.C.).

Parish et al., "A Polyanion Binding Site on the CD4 Molecule, Proximity to the HIV–gp120 Binding Region," *The Journal of Immunology*, vol. 145, No. 4, pp. 1188–1195, Aug. 15, 1990, published by the American Association of Immunologists, Inc. (Bethesda, MD).

Hässling, L. et al. "Biotin–Functionalized Self–Assembled Monolayers on Gold: Surface Plasmon Optical Studies of Specific Recognition Reactions," *Langmuir*, vol. 7, No. 9, pp. 1837–1840, Sep. 1991, published by the American Chemical Society (Washington, D.C.).

Jérôme, B., "Surface Effects and Anchoring in Liquid Crystals," *Rep. Prog. Phys.* vol. 54, pp. 391–452, 1991, published by IOP publishing Ltd. (United Kingdom).

Saji, T. et al., "Formation of Organic Thin Films by Electrolysis of Surfactants with the Ferrocenyl Moiety," *J. Am. Chem. Soc.*, vol. 113, pp. 450–456, published by the American Chemical Society (Washington D.C.)

Schmitt, F.–J. et al., "Surface Plasmon Studies of Specific Recognition Reactions at Self–Assembled Monolayers on Gold," *Thin Solid Films*, vol. 210/211, pp. 815–817, 1992, published by Elsevier Sequoia.

Charych, D.H. et al., "Direct Colorimetric Detection of a Receptor–Ligand Interaction by a Polymerized Bilayer Assembly",*Science*, vol. 261, pp. 585–588, Jul. 30, 1993, published by the American Association for the Advancement of Science (Washington D.C.).

Cocchi, J.M. et al., "Comparison Between Direct Binding, Competition and Agglutination Assays in the Characterization of Polyclonal Anti–idiotypes Against Anti–HBs Human Monoclonal Antibodies," *J. of Immunological Meth.*, vol. 160, pp. 1–9, 1993, Elsevier Science Publishers.

H. Weetall. "Preparation of Immobilized Proteins Covalently Coupled Through Silane Coupling Agents to Inorganic Supports," *Applied Biochemistry and Biotechnology*, vol. 41, pp. 157–188, 1993, published by Humana Press Inc. (Totowa, NJ).

Kuby, J., *Immunology*, Second Edition (1994), pp. 147–150, W.H. Freeman and Company (New York, NY).

Drawhorn, R. A. et al., "Anchoring of Nematic Liquid Crystals on Self–Assembled Monolayers Formed from Alkanethiols on Semitransparent Films of Gold," *J. Phys. Chem.*, vol. 99, pp. 16511–16515, 1995, published by the American Chemical Society (Washington D.C.).

Gupta, V. K. et al., "Uniform Anchoring of Nematic Liquid Crystals on Self–Assembled Monolayers Formed from Alkanethiols on Obliquely Deposited Films of Gold," *Langmuir*, vol. 12, pp. 2587–2593, 1996; published by American Chemical Society (Washington D.C.).

Gupta, V. K. et al., "Azimuthal Anchoring Transition of Nematic Liquid Crystals on Self–Assembled Monolayers Formed from Odd and Even Alkanethiols," *Physical Review E*, vol. 54, No. 5, pp. R4540–R4543, Nov. 1996, published by The American Physical Society (Washington D.C.).

Yang, H. C. et al., "Molecular Interactions between Organized, Surface–Confined Monolayers and Vapor–Phase Probe Molecules. B. Reactions between Acid–Terminated Self–Assembled Monolayers and Vapor–Phase Bases," *Langmuir*, vol. 12, pp. 726–735, 1996, published by American Chemical Society (Washington D.C.).

Gallardo, B. S. et al., "Ferrocenyl Surfactants at the Surface of Water: Principles for Active Control of Interfacial Properties," *Langmuir*, vol. 12, pp. 4116–4124, 1996, published by the American Chemical Society (Washington, D.C.).

Cornell, B.A. et al., "A Biosensor that uses Ion–Channel Switches," *Nature*, vol. 387, pp. 580–583, Jun. 5, 1997, published by Nature Publishing (New York, NY).

Lin, V. et al., "A Porous Silicon–Based Optical Interferometric Biosensor," *Science*, vol. 278, pp. 840–843, Oct. 31, 1997, published by the American Association for the Advancement of Science (Washington, D.C.).

Pan, J. J. et al., "Molecular Recognition and Colorimetric Detection of Cholera Toxin by Poly(diacetylene) Liposomes Incorporating Gm1 Ganglioside," *Langmuir*, vol. 13, No. 6, pp. 1365–1367, 1997, published by the American Chemical Society (Washington, D.C.).

Delamarche, E. et al., "Patterned Delivery of Immunoglobulins to Surfaces Using Microfluidic Networks," *Science*, vol. 276, pp. 779–781, May 2, 1997, published by the American Association for the Advancement of Science (Washington, D.C.).

Gupta, V.K. et al., "Optical Amplification of Ligand–Receptor Binding Using Liquid Crystals," *Science*, vol. 279, pp. 2077–2080, Mar. 27, 1998, published by the American Association for the Advancement of Science (Washington D.C.).

Ricco, A. J., "Surface Acoustic Wave Chemical Sensor Arrays: New Chemically Sensitive Interfaces Combined with Novel Cluster Analysis to Detect Volatile Organic Compounds and Mixtures," *Acc. Chem. Res.*, vol. 31, pp. 289–296, 1998, published by American Chemical Society (Washington D.C.).

Crooks, R. M. et al., "New Organic Materials Suitable for Use in Chemical Sensor Arrays," *Acc. Chem. Res.*, vol. 31, pp. 219–227, 1998, published by American Chemical Society (Washington D.C.).

Xia Y. et al., "Soft Lithography," *Angew. Chem. Int. Ed.*, vol. 37, pp. 551–575, 1998, published by Wiley Interscience (Germany).

Dancil, K. S. et al., "A Porous Silicon Optical Biosensor: Detection of Reversible Binding of IgG to a Protein A–Modified Surface," *J. Am. Chem. Soc.*, vol. 121 pp. 7925–7930, 1999, published by the American Chemical Society (Washington D.C.).

Naoka, M. et al., "Ferroelectric Liquid Crystal Alignment Films Utilizing Poly (DL amino acids) and Fibrous Proteins," *Kobunshi Ronbunshu*, vol. 56, No. 6, pp. 396–400, Jun. 1999.

Skaife, J. J. et al., "Quantitative Characterization of Obliquely Deposited Substrates of Gold by Atomic Force Microscopy: Influence of Substrate Topography on Anchoring of Liquid Crystals," *Chem. Mater.*, vol. 11, pp. 612–623, 1999, published by American Chemical Society (Washington D.C.).

Shah, R.R. et al., "Using Liquid Crystals To Image Reactants and Products of Acid–Base Reactions on Surfaces with Micrometer Resolution," *J. Am. Chem. Soc.*, vol. 121, pp. 11300–11310, published by American Chemical Society (Washington D.C.).

Kim, S–R. et al., "Orientations of Liquid Crystals on Mechanically Rubbed Films of Bovine Serum Albumin: A Possible Substrate for Biomolecular Assays Based on Liquid Crystals," *Anal. Chem.*, vol. 72, No. 19, pp. 4646–4653, Oct. 1, 2000, published by the American Chemical Society (Washington D.C.).

Power Point presentation regarding "Optical Detection and Amplification of Biomolecular Interactions Using Liquid Crystals", by Jeff Brake and Nicholas Abbott, dated Apr. 26, 2000. Presented at the University of Wisconsin–Madison, Madison, Wisconsin, on Apr. 26, 2000.

Niculescu, M. et al., "Redox Hydrogel–Based Amperometric Bienzyme Electrodes for Fish Freshness Monitoring," *Anal. Chem.*, vol. 72, pp. 1591–1597, 2000, published by American Chemical Society (Washington D.C.).

Shah, R. R. et al., "Coupling of the Orientations of Liquid Crystals to Electrical Double Layers Formed by the Dissociation of Surface–Immobilized Salts," *J. Phys. Chem. B*, vol. 105, pp. 4936–4950, 2001, published by American Chemical Society (Washington D.C.).

Abbott, N. L. et al., "Imaging of Adsorption and Self–Organization of Amphiphiles at Aqueous–Liquid Crystals Interfaces," American Chemical Society Book of Abstracts, 221st National Meeting, Apr. 1–5, 2001.

* cited by examiner

Co-injection of Liquid Crystal in One Cell

Diffusion front 31.5 °C

Electrooptical Cell for Liquid Crystal Display

*In situ* Electrochemical Control of Switching the Orientation of Liquid Crystal Ferrocene-terminated SAM Template Azimuthal
Orientation of 5CB Parallel to the Gold Topology of the Substrate Time

LIQUID CRYSTAL SWITCHING MECHANISM

CROSS-REFERENCES TO RELATED APPLICATIONS

This application claims priority to U.S. Provisional Application No. 60/315,372, filed Sep. 4, 2001, the entire disclosure of which is incorporated herein by reference.

GOVERNMENT RIGHTS

This invention was made with United States government support awarded by the following agency: ONR N00014-99-1-0250. The United States has certain rights in this invention.

FIELD OF THE INVENTION

The invention relates generally to switching devices that use liquid crystals. More particularly, the invention relates to switching devices prepared from polymers or self-assembled monolayers containing redox-active groups that induce a shift in the orientation of liquid crystals when the oxidation state of the redox-active group is altered.

BACKGROUND OF THE INVENTION

Various display devices are known in the art. The prior art devices generally require a relatively high voltage or a relatively high current. Because power (Watts) is determined by multiplying current (Amps) by voltage (Volts), P=I*V, such devices generally require relatively high power to operate. For example electrochromic displays exist that have a low switching potential but require a high current. Such devices typically consume too much power to be useful in portable devices. On the other hand, conventional displays use low currents but require high applied potentials such that power consumption is still too high for many applications.

Although suitable switching mechanisms exist, a need remains for switching mechanisms which operate at low power and moderate response times. These types of switching mechanisms might find use in applications such as electronic labels, electronic ink, or electronic paper. There is also substantial interest in finding ways to switch the orientations of liquid crystals using driving circuitry that can be easily fabricated.

SUMMARY OF THE INVENTION

The present invention provides liquid crystal devices in which the orientation of the liquid crystal is altered when the oxidation state of a redox-active group is changed. The invention further provides methods for producing liquid crystal devices, methods for changing the orientation of a liquid crystal, and kits for producing liquid crystal devices.

A liquid crystal switching device includes a first substrate having a first surface; a redox-active material disposed on at least a first portion of the first surface, the redox-active material comprising at least one redox-active group; a liquid crystal disposed above the top of the redox-active material; and a salt dispersed in the liquid crystal. When the oxidation state of the redox-active groups are changed from a first oxidation state to a second oxidation state, such as by electrochemical oxidation, electrochemical oxidation using a redox mediator species, or oxidation using a chemical oxidizing agent, the liquid crystal changes its orientation with respect to the first surface of the first substrate providing a detectable change in the appearance of the liquid crystal.

In some embodiments of the invention, the first surface of the first substrate, or at least one region of the first surface, is electrically conducting. Further liquid crystal devices are provided in which the electrically conducting surface or surface region is a metallized top surface or surface region. Further liquid crystal devices are provided in which the metallized top surface or surface region of the first substrate comprises a metal selected from gold, silver, copper, nickel, palladium, platinum, or combinations thereof. In embodiments where the first surface comprises at least one electrically conducting region, the redox-active material is disposed on at least a portion of the electrically conducting region.

In other provided devices, the redox-active groups are supported on electrically conducting surfaces or surface regions, other than a metallized surfaces or surface regions, such as surfaces or surface regions made from conducting organic materials such as polymers or conducting metal oxides, such as indium tin oxide (ITO) or titanium dioxide. ITO is a substrate in some provided devices because it is optically transparent. Conducting polymers are substrates in other provided devices and may be flexible.

Still other liquid crystal devices are provided in which the metallized top surface or surface region is gold. In some provided liquid crystal devices, the gold is uniformly deposited without any overall azimuthal preference whereas in other devices, the gold or other metal is obliquely deposited. In some provided devices, the gold is obliquely deposited at an angle of from 35° to 60° whereas in other devices the gold is deposited at an angle of at or about 40°. The angle is defined as the angle from the normal of the substrate.

Liquid crystal devices are further provided in which the surface-bound redox-active group is selected from a group that includes ferrocene; a derivatized ferrocene such as nonamethyl ferrocene; a viologen; a pyridine, bipyridine or salts of these; a metal meso porphyrin; a quinone; a hydroquinone; an anthracene and other monocyclic and polycyclic aromatic compounds; or combinations thereof. Still other liquid crystal devices are provided in which the surface-bound redox-active groups attached to a metallized surface or metallized surface region of a first substrate are formed by reacting a compound of formula Fc—$(CH_2)_n$—SH with the first surface or surface region forming a self-assembled monolayer (SAM) where Fc is ferrocene and n has a value ranging from 1 to 20, 3 to 18, 5 to 15, 6 to 14, 8 to 12, 9 to 11, 10, or 11.

Further liquid crystal devices are provided in which surface-bound redox-active groups are attached to one portion of the surface of the substrate and another portion of the surface of the substrate does not contain any of the surface-bound redox-active groups. In still other provided devices, the region of the surface of the substrate with surface-bound redox-active groups has a defined shape such as a number, letter, symbol, circle, triangle, square, pentagon or other polygon.

Other liquid crystal devices are provided in which the surface-bound redox-active groups attached to the surface of the substrate are redox-active groups of a polymer coated on the surface of the substrate. In further provided liquid crystal devices, the redox-active groups of the polymer are ferrocene groups whereas in yet other such devices the polymer is poly(vinylferrocene) or a polymer that incorporates at least some vinylferrocene.

Further liquid crystal devices are provided in which the liquid crystal is a nematic liquid crystal. Still other devices are provided in which the liquid crystal has a dipole moment that is parallel to the long axis of the liquid crystal. Yet other liquid crystal devices are provided in which the liquid crystal is 4-cyano-4'-pentylbiphenyl (5CB). Still other devices are provided in which the liquid crystal is either a cholesteric phase or a smectic phase, including ferroelectric phases (smectic C*).

Yet other liquid crystal devices are provided in which the salt of the device is a tetraalkylammonium salt. In some provided devices, the salt is a tetraalkylammonium tetrafluoroborate, a tetraalkylammonium hexafluorophosphate, or a tetraalkylammonium tetraphenylborate. In other provided devices, the salt is a tetraalkylammonium tetrafluoroborate or a 1-alkyl-4-alkylcarbamoyl-pyridinium tetrafluoroborate. In still other provided devices, the salt is a tetrabutylammonium salt such as tetrabutylammonium tetrafluoroborate. In other devices, the salt is a metal halide, such as, but not limited to, sodium bromide. In other devices, the salts are organic-inorganic hybrids involving organic encapsulated metals such as dicyclohexyl 18-crown-6 potassium tetrafluoroborate (18C-6/ $KBF_4$), 15-crown-5 sodium tetraphenyl borate (15C-5/ $NaO_4B$) or cryptofix-2-2-2 potassium tetrafluoroborate ($K^*$/ $BF_4$).

In still other provided liquid crystal devices, the salt is dispersed in the liquid crystal at a concentration of from 1 $\mu M$ to 80 mM assuming perfect dissolution. In still other provided devices, the salt is dispersed in the liquid crystal at a concentration of from 5 mM to 75 mM, of from 10 mM to 60 mM, of from 15 mM to 50 mM, of from 20 mM to 40 mM, of from 25 mM to 40 mM, of from 30 mM to 35 mM, or of about 35 mM.

Other liquid crystal devices are further provided in which the liquid crystal is oriented planar to the surface of the substrate when the redox-active group is in a reduced state and is oriented perpendicular to the surface of the substrate when the redox-active group is in an oxidized state.

Still other liquid crystal devices are provided in which the redox-active group of the device is oxidized using an oxidizing agent. In some provided devices, the oxidizing agent is a peroxide such as benzoyl peroxide.

Still other liquid crystal devices are provided in which the redox-active group is oxidized by applying a potential to the substrate or electrically conducting surface or surface region of the substrate.

Still further liquid crystal devices are provided which include a redox mediator, and the redox-active group is oxidized by interaction with the redox mediator. In some such provided devices, the redox mediator is dispersed within the liquid crystal and in still other such devices the redox mediator is selected from free ferrocene, pyridine compounds, bipyridine compounds, and metal ions such as $Co^{+2}$ and $Co^{+3}$.

Other liquid crystal devices are provided in which the substrate is selected from a metal, a polymer, or a silica material such as glass or quartz. In some provided liquid crystal devices, the substrate is a metal substrate and the top surface of the substrate provides a metallized surface. In other provided liquid crystals, the metallized top surface is a metal deposited on glass or quartz.

Further liquid crystal devices are provided that include a second substrate having a second surface. The second substrate overlies the first substrate defining a space between the top of the redox-active material and the second substrate, and the liquid crystal and salt are located in the defined space, forming an electrooptical cell. Some such liquid crystal devices are provided which further include a spacing material separating the first substrate from the second substrate. In certain provided devices, the spacing material is a polymeric film such as Mylar® brand film whereas in other provided devices, the spacing material is microspheres. Still other liquid crystal devices are provided in which the first surface of the first substrate or second surface of the second substrate is connected to a power supply and an electrical potential supplied by the power supply oxidizes the redox-active group bound to the first surface of the first substrate.

In some liquid crystal devices that include a second substrate have a second electrically conductive surface or surface region, the conductive material of the second surface or surface region includes a metal and in some such devices the included metal is selected from gold, silver, copper, nickel, palladium, platinum, or combinations of these metals. In some provided devices, the conductive material is a conducting polymer or conducting metal oxide as described above.

In some liquid crystal devices both the first and second substrates have at least one metallized surface or surface region made from the same metal. In some such provided devices, the second metallized surface or surface region is made from a metal without any azimuthal preference (does not cause a liquid crystal to assume any preferred, overall azimuthal orientation) whereas in other provided devices the metallized second surface or surface region of the second faces the liquid crystal and comprises an obliquely deposited metal such as those having the characteristics described above with respect to the first substrate. In some such provided devices, the first surface of the first substrate has a metallized surface or at least one metallized region having an obliquely deposited metal such as gold deposited thereon, and the second surface or surface region of the second substrate is an obliquely deposited metal such as gold. In some such devices, the direction of deposition of the metal for the second surface of the second substrate and the metallized surface of the first substrate is the same.

A liquid crystal electrooptical cell is further provided. The liquid crystal electrooptical cell includes a working electrode comprising a conductive material and a redox layer comprising redox-active molecules disposed on at least a portion of the working electrode, each of the redox-active molecules comprising at least one redox-active group; a counter electrode comprising a conductive material; a liquid crystal; and a salt. The working electrode and the counter electrode define a space at least partially filled with the liquid crystal, and the salt is dispersed in the liquid crystal. The redox-active material disposed on the surface of the working electrode contacts the liquid crystal in the space between the working and counter electrodes.

A liquid crystal electrooptical cell is further provided in which the liquid crystal and the salt have any of the characteristics described above.

Some liquid crystal electrooptical cells are provided in which the redox-active group is a pendant group of a polymer coated on the surface of the working electrode whereas in other provided cells, the redox-active group is present on a thiol that forms a self-assembled monolayer on the surface of the working electrode. In still other provided such cells, the polymer coated on the surface of the working electrode is a poly(vinylferrocene) or a polymer formed from vinylferrocene, and ferrocene is the redox-active group. In still other provided such cells, the self-assembled monolayer is formed from a ferrocenylalkanethiol having the formula $Fc-(CH_2)_n-SH$ where Fc is ferrocene and n has any of the values described above.

Liquid crystal electrooptical cells are further provided which include a spacer material such as a film or microspheres that separates the working electrode from the counter electrode. Yet other liquid crystal electrooptical cells are provided in which the liquid crystal further includes a redox mediator having any of the characteristics described above.

Still other liquid crystal electrooptical cells are provided in which the working electrode is a metallized top surface or surface region of a substrate. In yet other such cells, the metallized top surface or surface region of the substrate and the substrate have any of the characteristics described above.

Still other liquid crystal electrooptical cells are provided in which the counter electrode is a metal having any of the characteristics described above, and other liquid crystal electrooptical cells are provided in which the counter electrode has any of the features of the second substrate described above. Yet other liquid crystal electrooptical cells are provided in which the redox-active material disposed on at least one portion of a surface of the first electrode is disposed on a portion having a defined shape as described above.

In one embodiment, the invention provides a liquid crystal electrooptical cell. The electrooptical cell includes a working electrode comprising a glass slide support having an obliquely deposited gold top surface and a self-assembled monolayer formed by contacting a ferrocenylalkanethiol with the obliquely deposited gold top surface, wherein the ferrocenyl alkanethiol has the structure Fc—$(CH_2)_n$—SH, wherein Fc is ferrocene and n is an integer having a value from 10 to 12. The electrooptical cell also includes a counter electrode comprising a gold surface positioned at least 25 $\mu$m away from the obliquely deposited gold top surface of the working electrode defining a space between the gold surface of the counter electrode and the obliquely deposited gold top surface of the working electrode. The obliquely deposited gold top surface of the working electrode faces the gold surface of the counter electrode, and the obliquely deposited gold top surface of the working electrode and the gold surface of the counter electrode are positioned such that the surfaces are parallel to one another. A doped liquid crystal fills at least a portion of the space defined by the gold surface of the counter electrode and the obliquely deposited gold top surface of the working electrode. In some such embodiments, the doped liquid crystal comprising 4-cyano-4'-pentylbiphenyl and tetrabutylammonium tetrafluoroborate.

In A method of manufacturing a liquid crystal device is further provided. The method includes depositing a material having one or more redox-active groups on at least a portion of a surface of a substrate material, disposing a liquid crystal over the material having the redox-active groups; and dispersing a salt in the liquid crystal.

Further methods are provided in which the salt is dispersed in the liquid crystal before the liquid crystal is disposed over the material having the redox-active groups. In the provided methods, the liquid crystal and the salt have any of the features described above.

Further methods are provided which include positioning a second substrate over the surface of the first substrate on which the redox-active groups have been deposited. In yet other provided methods, a spacing material is positioned over the surface of the first substrate material on which the material with the redox-active group has been deposited and then the second substrate material is placed over the spacing material. In still other provided methods the substrate on which the material with the redox-active group has been deposited and the second substrate are both planar and spaced apart in a parallel fashion. In still other provided methods, the surface of a planar conductive material on which a material with a redox-active group has been deposited is positioned less than or about 25 $\mu$m from a nearest surface of a second planar conducting material. In the provided methods, the first and second substrates have any of the features described above.

Further methods are provided which include depositing the redox-active material over at least a portion of the surface of a substrate where the surface and the substrate have any of the features described above. In still other provided methods, the material with the redox-active groups is coated on the surface of the substrate. In yet other provided methods, the material coated on the surface of the substrate is a polymer that includes the redox-active groups. In still other provided methods, the polymer has pendant ferrocene groups such as polymers formed from vinylferrocene such as poly(vinylferrocene) and other polymers that incorporate vinylferrocene.

A method of changing the orientation of a liquid crystal is further provided. The method includes oxidizing or reducing the redox-active group of any of the liquid crystal devices or cells described above. In some provided such methods, the redox-active group is oxidized with a chemical oxidizing agent. In some such provided methods, the chemical oxidizing agent is a peroxide and in other provided methods the chemical oxidizing agent is benzoyl peroxide.

Other methods for changing the orientation of a liquid crystal are provided in which the redox-active group is oxidized or reduced by applying a potential to an electrically conducting surface such as the metallized top surface or surface region of the first substrate of some embodiments, or the conductive material of the second substrate. In other provided methods, the orientation of the liquid crystal is changed by applying a potential to the working or counter electrode of a liquid crystal electrooptical cell, thereby oxidizing or reducing the redox-active group. In some provided methods, a potential of less than +350 mV is sufficient to oxidize the redox-active group. In other provided methods, a potential of less than +250 mV is sufficient to oxidize the redox-active group. In still other provided methods, a potential of less than +200 mV, less than +100 mV, or less than +50 mV is sufficient to oxidize the redox-active group.

A kit for manufacturing a liquid crystal device is further provided. The kit includes a substrate having a surface having any of the features described above; a material with a redox-active group having any of the features described above; a liquid crystal having any of the features described above; and a salt having any of the features described above. Some provided kits further include instructions for assembling a liquid crystal device or cell.

Further kits are provided which include a second substrate or a second electrode having any of the features described above.

Further kits are provided which further include a spacing material having the features described above for use in spacing a first substrate from a second substrate or a first electrode from a second electrode.

In some provided kits, the material with the redox-active group is disposed on a surface of the substrate whereas in other provided kits, the instructions describe how the material with the redox-active group is placed on the surface of the substrate.

Further objects, features and advantages of the invention will be apparent from the following detailed description when taken in conjunction with the accompanying drawings.

BRIEF DESCRIPTION OF THE DRAWINGS

FIG. 16 also shows the optical textures of the liquid crystal cell at various points on the cyclic voltammogram.

FIG. 17 also includes scanned images through an optical microscope with cross-polarizers of the optical textures of the cells after insertion of a quarter wave plate into the optical path of the polarized light microscope.

FIG. 18 also includes scanned images through an optical microscope with cross-polarizers showing the optical textures of the cell monitored through cross polars as oxidizing and reducing potentials of +/−300 mV was applied to the working electrode.

DETAILED DESCRIPTION OF THE INVENTION

Generally, the invention provides liquid crystal devices, liquid crystal cells such as liquid crystal electrooptical cells, kits, and methods for manufacturing such devices and cells. The invention also generally provides methods for changing the orientation of a liquid crystal in a liquid crystal device or cell.

All ranges recited herein include all combinations and subcombinations included within that range's limits. For example, a deposition angle of from about 30° to about 60° includes ranges of from 30° to 60°, of from 35° to 55°, of from 40° to 52°, of from 50° to 60°, and angles of about 50°, of 50°, of about 40°, of about 45°, and of about 55° etc.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into subranges as discussed above.

Figure 3:
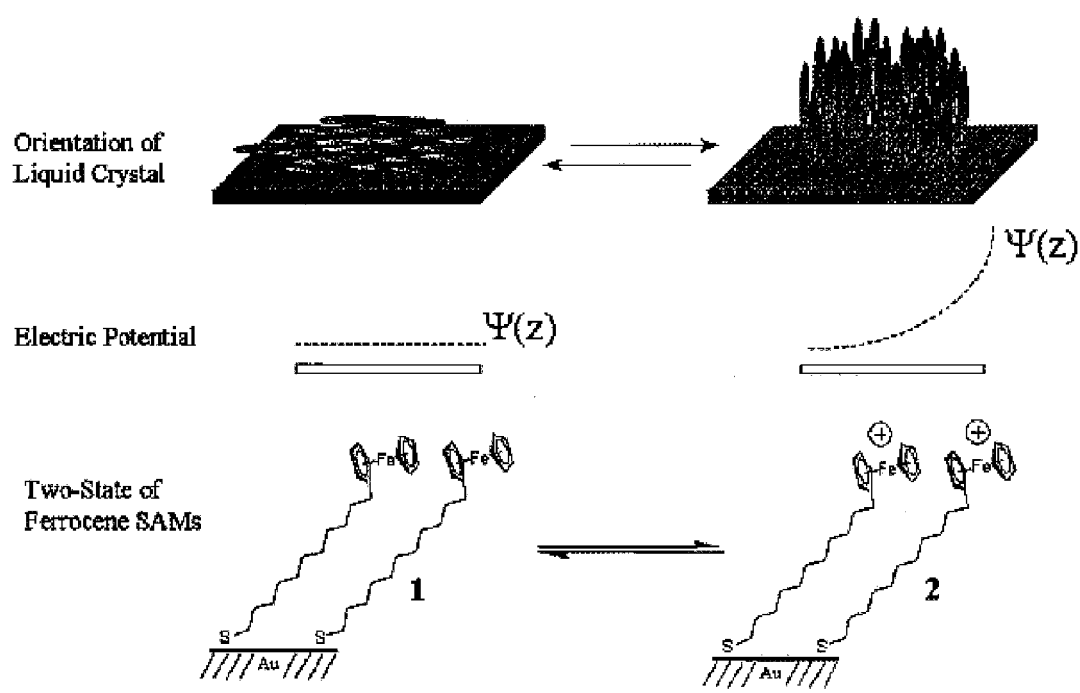
FIG. 3 is a schematic diagram showing how the orientation of a liquid crystal such as 5CB changes when the ferrocene groups of a SAM containing a tethered ferrocene are oxidized.

The present invention is directed to a switching mechanism for liquid crystal displays operating at low potentials, for example at lower than 300 mV, 250 mV, 200 mV, or 100 mV. An electrooptical cell includes a liquid crystal doped with an electrolyte or salt, a working electrode, and a counter electrode. The working electrode is preferably constructed of a substrate having an electrically conducting surface or at least one electrically conducting surface region. More than one working electrode may be deposited on a single substrate. In such an embodiment, the substrate will have two or more electrically conducting surface regions that serve as electrodes. Each of the working electrodes has self-assembled monolayers of alkanethiols on a metal such as gold or silver disposed thereon. In one embodiment the metal of a metal working electrode or electrodes may be uniformly deposited by any means known to those skilled in the art or may be obliquely deposited on a support such as a glass slide or quartz. The alkanethiols preferably include redox-active groups such as, but not limited to ferrocene. The counter electrode is preferably a conductive material, preferably a metal such as gold, silver, copper, nickel, platinum, or palladium and more preferably gold which may be uniformly deposited by any means known to those skilled in the art or may be obliquely deposited on a substrate such as a glass slide or quartz. The electrodes can also be made from a metal oxide or conducting polymer. The liquid crystal preferably has a dipole moment that is parallel to the long axis of the liquid crystal molecule and the salt is preferably one that is stable to the redox chemistry in the cell. In other liquid crystals cells, the liquid crystal preferably has a dipole moment that is perpendicular to its long axis. Such salts include 1-alkyl-4-alkylcarbamoyl-pyridinium tetrafluoroborate, dicyclohexyl 18-crown-6 potassium tetrafluoroborate (18C-6/$KBF_4$), 15-crown-5 sodium tetraphenyl borate (15C-5/$NaO_4B$), cryptofix-2-2-2 potassium tetrafluoroborate ($K^*$/$BF_4$), and tetraalkylammonium salts such as tetrabutylammonium tetrafluoroborate, hexafluorophosphate, and tetraphenylborate. The surface charge of the working electrode is controlled by the reversible redox transformation of the redox-active group for example by the reversible redox transformation of ferrocene to ferrocenium as shown in FIG. 3.

In some embodiments of the invention, the liquid crystal switching device includes more than one working electrode, each of which has a redox-active material disposed on at least a portion of the electrode. In addition, the liquid crystal switching devices may be designed such that two or more of these working electrodes share a counter electrode. Two or more electrodes, including both working and counter electrodes, may be patterned onto a single substrate surface to form a "patterned electrode" design wherein the electrodes are in a co-planer arrangement. This may be accomplished by depositing an electrically conducting material, such as a metal, onto two or more regions of a substrate, followed by depositing one or more similar or different redox-active material onto at least a portion of the electrically conducting material of the working electrodes. The patterned deposition of conducting materials, such as metals, may be accomplished by means well known in the art.

The transformation in the oxidation state of the redox-active group on the surface of the working electrode leads to formation/disassembly of an electrical double layer at the surface. The electric field localized within the double layer changes the orientation of the liquid crystal as shown in FIG. 3. The mechanism of switching the orientation of liquid crystal by an electric double layer differs from conventional electric field induced mechanisms in that it requires application of a very low potential allowing the liquid crystal devices and cells to be used in a variety of applications such as, but not limited to, in mobile displays, for example electronic paper applications. Furthermore, the switching mechanism for the change in orientation of the liquid crystal from a first orientation to a second orientation based on the redox-active group transformation from a first oxidation state to a second oxidation state allows the construction of devices and cells where potentials of as low as 300 mV, 200 mV, or 100 mV are used thereby further increasing the range of applications in which the devices may be used. In some preferred embodiments the change in the orientation of the liquid crystal is reversible, such that when the second oxidation state of the redox-active groups is changed back to the first oxidation state, the orientation of the liquid crystal changes from the second orientation back to the first orientation. The characteristics of the switching mechanism allow the working and counter electrode to be spaced with fewer restrictions on their relative location than in any conventional liquid crystal-based display system. This is because the electric field is largely confined to the electrical double layer. Finally, the ability to pattern the working electrode or electrodes such that certain desired regions contain the redox-active group whereas other areas do not allows display devices to be prepared which display any symbol, geometric shape, number, letter, or other desired shape.

Some of the characteristics which a suitable liquid crystal switching device should possess generally include: a surface with redox-active material disposed thereon, a liquid crystal, and a salt dispersed in the liquid crystal. The liquid crystal is typically deposited over the surface with the redox-active material disposed thereon, and the oxidation or reduction of redox-active groups on the redox-active material results in a detectable change in the orientation of the liquid crystal.

The redox-active material may take various forms. In one preferred embodiment, the redox-active material is a self-assembled monolayer (SAM) formed from a thiol that includes one or more redox-active groups, and the redox-active material overlies a metallized top surface of a substrate that includes a support. However, this is not required in the devices and electrooptical cells as other electrically conducting materials may be used in place of metal in electrooptical cells, and an electrically conducting material is not even necessary where oxidation of the redox-active group is accomplished using a chemical oxidizing agent. For example, other preferred switching devices include, but are not limited to, a semiconductor-based substrate with a self-assembled monolayer containing redox-active groups disposed thereon. The self-assembled monolayer in preferred such devices is an alkanethiol that bears the redox-active group. Gallium arsenide is an example of one preferred semiconductor material that may be used in such a device, although any other suitable semiconductor material on which a self-assembled monolayer may form may also be employed. A conducting polymer can also be used as a conducting substrate. Thus, many different types of surfaces having redox-active materials disposed thereon may be utilized in liquid crystal switching devices. Suitable redox-active materials include, but are not limited to, the SAM formed from an alkanethiol or other thiol with a redox-active group; polymers with pendant redox-active groups; and rubbed surfaces with redox-active groups such as rubbed polymer surfaces formed from polymers containing ferrocene or other redox-active groups. Other suitable redox-active materials include, polymers with redox-active pendant groups such as, but not limited to polymers with pendant ferrocene groups, such as, but not limited to, polymers prepared using vinylferrocene as a monomer such as poly(vinylferrocene) and other polymers prepared from vinylferrocene and other monomers such as styrene, acrylates, methacrylates, and acetonitrile disposed thereon.

Generally, the redox-active material overlies a support forming a substrate. A wide variety of materials may be used as supports in the devices and methods of the present invention as will be apparent to those skilled in the art. Preferred supports include metals, polymers, and silica-containing materials such as glass and quartz. Examples of polymeric supports include, but are not limited to, polystyrene, polycarbonates, and polymethyl methacrylate. Other materials suitable for use as supports include metal oxides such as, but not limited to, indium oxide, tin oxide, and magnesium oxide and metals such as, but not limited to, gold, silver, copper, nickel, palladium, and platinum. Still other materials that may be used as supports include cellulosic materials such as nitrocellulose, wood, paper, and cardboard, and sol-gel materials. Especially preferred supports include glass, quartz, and silica, and most preferred supports include metals, glass slides, glass plates, and silica wafers. Preferably, such supports are cleaned prior to use where applicable. For example, glass slides and plates may be cleaned by treatment in "piranha solution" (70% $H_2SO_4$/30% $H_2O_2$) for 1 hour and then rinsed with deionized water before drying under a stream of nitrogen. "Piranha solution" requires care in handling as it reacts violently with organic compounds and should not be stored in closed containers.

A preferred substrate for use in accordance with the present invention contains a top surface with a layer of obliquely deposited metal on it, although various methods known to those skilled in the art may be used to prepare a metallized top surface. Furthermore, as shown in the experiments that follow, a uniformly deposited metal surface may be used as no organized topography as formed by oblique deposition of metals is required in the devices and cells of the invention. Such methods include, but are not limited to, evaporation to form a uniformly deposited metal surface, sputtering, and electrodeless deposition. Metals that may be used include, but are not limited to gold, silver, copper, nickel, platinum, and palladium. Preferred metals include gold and silver with gold being especially preferred. Typically, an obliquely deposited gold or silver surface will overlay a surface of titanium or another adhesion promoting material which has already been deposited on a top surface of the support. The use of the titanium provides better adhesion of the obliquely deposited silver, or more preferably gold in preparing the metallized surface. However, use of titanium or another adhesion-promoting material is not required as suitable liquid crystal devices and cells may be prepared without the use of such materials. Furthermore, since the support may be metal, the top surface of the metal support may be used without any deposition of any kind being required. If an adhesion promoting material is used, a layer of varying thickness may be applied to the underlying support. In preferred embodiments, approximately 10 Å of Ti is deposited on a support such as a glass slide or plate. In other preferred embodiments, the amount of adhesion-promoting material ranges from 5 Å to 1000 Å, from 5 Å to 20 Å, and more preferably from 8 Å to 15 Å. Other adhesion promoting materials include chromium. Because chromium is mobile in gold, titanium is sometimes preferred over chromium when preparing thin films of gold. Still another type of adhesion promoter is an organic layer formed from a compound such as, but not limited to, mercaptopropyltrimethoxysilane.

In more preferred embodiments, a layer of an obliquely deposited metal, preferably gold, is deposited onto at least one region of a cleaned surface of a substrate by evaporating it at a rate of about 0.2 Å/s at a pressure of less than or about $5 \times 10^{-6}$ torr. See Gupta, V. K. et al. Chemistry of Materials, 8, (1996), p. 1366. In other preferred embodiments, a metal such as gold is deposited on a top surface of a support that contains an adhesion-promoting material such as titanium. The layer of a metal such as gold on the metallized surface of the support typically ranges from at or about 30 Å to at or about 500 Å, or more preferably from 50 Å to 300 Å in thickness. More preferably, the layer of a metal such as gold deposited on the surface of the support ranges from about 80 Å to about 250 Å in thickness or from about 90 Å to about 200 Å in thickness. Most preferably, the layer of the metal such as gold deposited on the support is from 100 Å or about 100 Å to 200 Å or about 200 Å. In some preferred embodiments, gold is deposited at an angle of from 30° or about 30° to 50° or about 50°. In other preferred embodiments, gold is deposited at an angle of 50° or about 50°. Different angles of metal deposition may be preferred depending on the particular application as will be apparent to those skilled in the art. The metallized surface obtained after deposition of the metal is generally an anisotropically rough and semi-transparent surface. Such surfaces are also suitable in the counter electrode or the second substrate in an electrooptical cell.

As noted above, the liquid crystal switching device includes a surface with a redox-active material disposed thereon. The redox-active material is preferably bound to a metallized top surface of a substrate. Although the use of a substrate with a metal surface as described above is not required, when such a surface is utilized it is highly preferred that the redox-active material is a SAM formed from a thiol such as, but not limited to, an alkanethiol containing the redox-active group. Such thiols are typically adsorbed on the metallized surface of the support and may be used in conjunction with other thiols that do not contain the redox-active group. The alkanethiol may be adsorbed on the metallized surface from a solution that includes the thiol or thiols. In this manner, the alkanethiol will be adsorbed on the metallized surface forming a SAM that presents surface-bound redox-active groups for interaction with the liquid crystal. When using metal oxides, metals or conducting polymers, the redox-active group can be bound to the substrates using silane chemistries and other chemistries that will be apparent to those skilled in the art.

Various redox-active groups may be used in accordance with the present invention. Examples of such groups include, but are not limited to: ferrocene; derivatized ferrocene such as nonamethylferrocene; pyridine groups; bipyridine groups; viologens; porphyrins such as metal mesoporphyrins; quinones; and hydroquinones. Preferred redox-active groups include ferrocene and derivatized ferrocenes.

An especially preferred redox-active group is ferrocene on an alkanethiol such as a ferrocenylalkane-1-thiols. Preferred alkanethiols with ferrocene groups include alkanethiols with the formula $HS(CH_2)_nFc$ where Fc is ferrocene and n has a value ranging from 1 to 20, 3 to 18, 5 to 15, 6 to 14, 8 to 12, 9 to 11, 10, or 11.

As noted above, a preferred redox-active material in the devices and methods of the present invention includes a material prepared by adsorbing an alkanethiol with a redox-active group on a substrate having a top surface that contains an obliquely deposited gold or silver (the metallized surface) overlying a support. This is typically accomplished by immersing the substrate with the obliquely deposited gold or silver in a solution containing the alkanethiol. Alternatively, a solution may be dropped or poured onto the surface or otherwise contacted with the surface of the support containing the metal. The thiol (—SH) group of the alkanethiol binds to the metal on the support immobilizing the alkanethiol on the surface and forming a SAM. As noted above, the alkanethiol is often adsorbed onto the surface of the support from a solution containing the alkanethiol. In some embodiments, the alkanethiol is present in water or an alcohol such as ethanol or methanol although other liquids may also be employed in accordance with the invention.

Various alkanethiols without redox-active groups may be used in conjunction with the alkanethiol including the redox-active group to prepare suitable surfaces for use in the devices and cells of the present invention. Suitable such alkanethiols include, but are not limited to, $C_4$ to $C_{20}$ alkanethiols such as butanethiol, pentanethiol, hexanethiol, heptanethiol, octanethiol, nonanethiol, decanethiol, undecanethiol, dodecanethiol, tridecanethiol, tetradecanethiol, pentadecanethiol, hexadecanethiol, heptadecanethiol, octadecanethiol, nonadecanethiol, and eicosanethiol. More preferred alkanethiols include $C_5$ to $C_{16}$ alkanethiols, $C_6$ to $C_{16}$ alkanethiols, $C_8$ to $C_{14}$ alkanethiols, and $C_{10}$ to $C_{14}$ alkanethiols. Those skilled in the art will recognize that dialkyl disulfides, R—S—S—R, may also be used to prepare suitable surfaces.

The concentration of the alkanethiol in the solution used for alkanethiol adsorption generally ranges from about 1 micromolar to 10 millimolar. A preferred concentration range is 100 micromolar to 2 millimolar, with adsorption times ranging from typically 2 minutes to 24 hours. A preferred adsorption time is between 1 hour and 6 hours. Typically, preferred surfaces were prepared by contacting metallized surfaces of a support with an ethanolic solution of an alkanethiol containing a redox-active group such as Fc—$(CH_2)_{11}$—SH, but they may be prepared by using a solution that contains a mixture of Fc—$(CH_2)_n$—SH and an alkanethiol that does not include a redox-active group at a total alkanethiol concentration of 1 mM for a period of at least about 1 hour. Longer or shorter contact times may be used as long as a densely packed monolayer is obtained as will be apparent to those of skill in the art. Generally, the lower the concentration of the alkanethiol in the alkanethiol solution, the longer the metallized surface will be contacted with the alkanethiol solution. Conversely, the higher the concentration of the alkanethiol in the alkanethiol solution, the shorter the metallized surface will be contacted with the alkanethiol.

The alkanethiols are typically adsorbed onto the metallized surface of the support in solutions at temperatures ranging from about 15° C. to about 50° C., from about 20° C. to about 40° C., from about 22° C. to about 40° C., or from about 25° C. to about 37° C. A preferred temperature range is from about 22° C. to about 28° C., and a more preferred temperature is about 25° C. or room temperature. A steady temperature is not necessary, and the temperature may be increased or decreased during the alkanethiol adsorption. Sometimes, improved thermal stability of a monolayer may be achieved by adsorbing the monolayer at an elevated temperature. Generally, the temperature of the alkanethiol solution is not critical to the preparation of the liquid crystal switching device. After an alkanethiol has been adsorbed onto the metallized surface of a preferred support, the surface of the support is typically rinsed with ethanol. The ethanol is then usually removed by blowing a stream of $N_2$ or other inert gas over the rinsed surface.

In one preferred device of the present invention, a support with a metallized top surface is first prepared and then the redox-active layer is prepared using microcontact printing. In such a method, a stamp is first prepared using a polymer such as elastomeric polydimethylsiloxane. Such a stamp may be prepared by pouring a mixture of an elastomer such as Sylgard® 184CA brand polydimethylsiloxane (PDMS) in a master, such as a silicon master, with a curing agent in an appropriate curing ratio such as a 10:1 ratio of PDMS to curing agent. The width and depth of the relief may vary according to the application and any shape may be used to provide surfaces with various regions which contain the redox-active layer. In one application, the width of the relief is 15 μm and the depth of the relief is about 20 μm. After removal of entrained air bubbles such as by use of an applied vacuum, the mixture is allowed to cure. The stamp is then gently removed and rinsed. The rinsed stamp is then "inked" by placing a drop of a solution, such as ethanolic solution, containing alkanethiols on the stamp. In one procedure, the alkanethiols do not contain the redox-active group and include such alkanethiols as $H_3C(CH_2)_{11}SH$, $H_3C(CH_2)_{15}SH$, and combinations of such alkanethiols. The stamp is then typically dried and placed on a metallized surface such as an obliquely deposited gold surface for an appropriate period of time such as about 5 seconds or for about 15–20 seconds. The stamped film of gold is then typically rinsed with a solvent such as ethanol or water and placed in a solution of an alkanethiol with a redox-active group or a mixture of an alkanethiol with a redox-active group and an alkanethiol(s) without such a group. For example, the stamped film may be placed in an ethanolic 1 mM solution of Fc—$(CH_2)_{11}$—SH and $H_3C(CH_2)_{15}SH$. This provides a surface with a redox-active material in areas defined by the stamping procedure. As one skilled in the art will readily recognize, the stamp may be treated with an alkanethiol containing a redox-active group and then placed in a solution of alkanethiols that do not include the redox-active group. This will result in a redox-active material where the orientation of a liquid crystal will be switched in some areas and not in others when the oxidation state of the redox-active group is changed. Furthermore, it will be recognized that surfaces may be prepared where different redox-active groups are applied to different areas such that some areas will be oxidized at different applied potential than other areas providing flexibility in the display that is created by the change in orientation of the liquid crystal depending on the applied potential. In one embodiment of the liquid crystal switching device, a first surface of a first substrate comprises at least two portions having different redox-active materials with different redox-potentials disposed thereon.

Those skilled in the art will recognize that variations on the above procedure could also be used to produce a multiarray. In one such preferred procedure, rather than "spotting" droplets of liquid on a surface, a fluidic channel (e.g., made from micromolded polydimethylsiloxane) is used to deliver liquids to localized regions of a surface similar to the stamping method described above. Generally, any method known to those skilled in the art for delivering liquids to localized regions of a surface could be used to produce the preferred microarray devices.

The liquid crystals of the devices, electrooptical cells, kits and methods of the present invention change their orientation when the oxidation state of the redox-active group is changed. For example, the orientation of the liquid crystal on a surface prior to oxidation may be planar and perpendicular after oxidation of the redox-active group. The Examples demonstrate that the orientation of a liquid crystal such as 5CB on a surface bearing ferrocene changes to perpendicular after the ferrocene is oxidized to the ferrocenium ion. Generally, it is preferred that the liquid crystal has a dipole moment that is parallel to the long axis of the liquid crystal molecule so that when the redox-active group is oxidized the orientation of the liquid crystal will be perpendicular to the surface. A large listing of liquid crystals suitable for use in the present invention is presented in "Handbook of Liquid Crystal Research" by Peter J. Collings and Jay S. Patel, Oxford University Press, 1997, ISBN 0-19-508442-X. An especially preferred liquid crystal for use in the present invention is 4-cyano-4'-pentylbiphenyl or 5CB. Although various types of liquid crystal may be employed, nematic liquid crystal are preferred. However, smectic liquid crystals formed from 8CB are also suitable for use in the present invention. The liquid crystal is disposed above the redox-active material so that the liquid crystal is disposed on the redox-active groups. The liquid crystal may be applied to the redox-active material using any technique known to those skilled in the art. In one embodiment for preparing an electrooptical cell, a nematic liquid crystal is heated into its isotropic phase and drawn by capillary action into a space between two surfaces in an electrooptical cell. In another embodiment, the liquid crystal is spin-coated onto the redox-active material, such as a SAM. The thickness of the film of liquid crystal formed on top of the redox-active material containing the redox-active groups preferably ranges from 1 $\mu$m to 100 $\mu$m, from 2 $\mu$m to 50 $\mu$m, from 5 $\mu$m to 20 $\mu$m, or more preferably is about 10 $\mu$m.

The liquid crystal used in the present invention is doped with a salt that is stable to the redox chemistry associated with the oxidation and reduction of the redox-active group. Various salts may be used in the invention. In addition to the salts listed below, metal halides, where the metals are sodium, cesium, potassium, rubidium, or lithium, and the halides are fluoride, chloride, bromide, or iodide are suitable for use in the present invention. Other suitable salts include hybrids of organic and inorganic species to facilitate the solubility and dissociation in liquid crystal such as dicyclohexyl 18-crown-6 potassium tetrafluoroborate (18C-6/KBF$_4$), 15-crown-5 sodium tetraphenyl borate (15C-5/NaO$_4$B), cryptofix-2-2-2 potassium tetrafluoroborate (K*/BF$_4$) or 1-alkyl-4-alkylcarbamoyl-pyridinium tetrafluoroborate. Although the presence of salts is generally deleterious to the performance of devices that use liquid crystal, surprisingly and unexpectedly it has been discovered that salts greatly improve the performance of the devices and electrooptical cells of the present invention. Preferred salts for use in the present invention include tetraalkylammonium salts such as tetramethylammonium, tetraethylammonium, tetrapropylammonium, and especially tetrabutylammonium salts. Suitable counterions include, but are not limited to tetrafluoroborate, hexafluorophosphate, tetraphenylborate, and alkyl sulfonate. One particularly preferred counterion is the tetrafluoroborate ion such that especially preferred salts are tetraalkylammonium tetrafluoroborates such as tetrabutylammonium tetrafluoroborate (TBAF). The salt is generally dispersed in the liquid crystal prior to introduction into a device or cell of the invention. Although the salt does not completely dissociate in the liquid crystal as it would come close to doing in an aqueous solution, it is dispersed in the liquid crystal. In preferred devices and electrooptical cells, the salt is dispersed in the liquid crystal at a concentration of from 1 $\mu$M to 80 mM assuming perfect dissolution. In still other provided devices, the salt is dispersed in the liquid crystal at a concentration of from 5 mM to 75 mM, of from 10 mM to 60 mM, of from 15 mM to 50 mM, of from 20 mM to 40 mM, of from 25 mM to 40 mM, of from 30 mM to 35 mM, or of about 35 mM assuming perfect dissolution. Oxidation of the redox-active group produces an ion that interacts with the anion of the salt forming an electric double layer which produces an electric field altering the orientation of the liquid crystal producing the visible change in the liquid crystal device at the short times described in the Experiments that follow. If the redox process was a reduction, then the redox-group produces an ion that interacts with the cation of the salt. Debye lengths may be calculated based on concentrations of the salt in the liquid crystal. Concentration of salt in the millimolar range give Debye lengths in nanometers. This means that application of a small electrical potential can give rise to large electric fields with the electrical double layer. This is because the electric field is approximately the value of the surface potential divided by the Debye length. Thus, the reorientation of the liquid crystal can be driven by application of a small potential. This has important implications in the devices and cells of the present application. For example, the power consumption will be low. The conducting electrode (i.e. working electrode) need only be designed to deliver a small potential. The tendency of the electrode to fail with large numbers of cycles will be small. Also, because the electric field is largely confined to the electrical double layer, the location of the counter electrode is not important provided it can function as a counter electrode. For example, it could be placed on the same surface, adjacent to the working electrode with redox-active groups. Also, one counter electrode can serve more than working electrode (i.e. more than one surface with redox-active groups disposed thereon). In contrast, in conventional liquid crystal switches, the electric field reorients the liquid crystal by acting across the bulk of the liquid crystal. In this case, the counter electrode must be placed carefully to deliver the electric field to the liquid crystal. The simplification of the counter electrode in this invention should reduce the production cost, and enhance both the quality control and robustness of the application device. Furthermore, there can be an in-plane component of the electrical field which points in the direction of a liquid crystal with a dipole moment parallel to its long axis when the liquid crystal is perpendicular as when the redox-active group is in an oxidized state.

In various preferred embodiments, the liquid crystal further includes a redox mediator which may react with the redox-active group to change the oxidation state of the group. Examples of such redox mediators include, but are not limited to, free ferrocene, pyridine compounds, bipyridine compounds, and metal ions such as $Co^{+2}$ and $Co^{+3}$.

The oxidation state of the redox-active group may be changed using a chemical oxidizing agent or by application of a potential. Thus, a method of changing the orientation of a liquid crystal includes oxidizing or reducing the redox-active group of any of the liquid crystal devices or cells described above. In some preferred methods, the redox-active group is oxidized with a chemical oxidizing agent. In some other preferred methods, the chemical oxidizing agent is a peroxide and in other preferred methods the chemical oxidizing agent is benzoyl peroxide although many other oxidizing agents may be used as will be known to those skilled in the art.

Other preferred methods for changing the orientation of a liquid crystal are those in which the redox-active group is oxidized by applying a potential to a conductive surface of the first substrate or to the conductive material of the second substrate. In other preferred methods, the orientation of the liquid crystal is changed by applying a potential to the working or counter electrode of a liquid crystal electrooptical cell thereby oxidizing or reducing the redox-active group. In some preferred methods, a potential of less than +350 mV is sufficient to oxidize the redox-active group. In other preferred methods, a potential of less than +250 mV is sufficient to oxidize the redox-active group. In still other preferred methods, a potential of less than +200 mV, of less than +100 mV, or less than +50 mV is sufficient to oxidize the redox-active group.

Liquid crystal devices that further include a second substrate that includes a conductive material may form a liquid crystal cell. The second substrate of a liquid crystal cell overlies the first substrate defining a space or cavity between the top of the redox-active material and the second substrate, and the liquid crystal and salt are located in the defined space. The second substrate may have any of the features described above with respect to the first substrate, but need not have redox-active material disposed thereon. In some cases, a second substrate of a liquid crystal cell will be a simple metal electrode or a bare metal such as a gold or silver sheet. Preferred liquid crystal cells also may include a spacing material separating the first substrate from the second substrate. In certain preferred devices, the spacing material is a polymeric film such as Mylar® or Saran® brands of film whereas in other preferred devices, the spacing material is microspheres. In still other preferred liquid crystal devices, the first or second substrate is connected to a power supply, and a potential supplied by the power supply changes the oxidation state of the redox-active group of the redox-active material disposed on the surface of the first substrate.

In some liquid crystal devices that include two conductive substrates, the surface or at least one region of the surface of the conductive material of the second substrate includes a metal and in some such devices the included metal is selected from gold, silver, copper, nickel, palladium, platinum, or combinations of these metals.

In some liquid crystal devices that include two substrates having metallized surfaces, the metal of the conductive material of the second substrate and the metal of the metallized top surface of the first substrate are the same. In some preferred embodiments, the second substrate is a metal without any azimuthal preference whereas in other preferred embodiments, the second substrate includes an inner surface that faces the liquid crystal and the inner surface is one that comprises an obliquely deposited metal surface such as those having the characteristics described above with respect to the first substrate. In some such preferred embodiments, the metallized top surface of the first substrate is an obliquely deposited metal such as gold and the inner surface of the second substrate is an obliquely deposited metal such as gold. In some such devices, the direction of deposition of the metal for the inner surface and the metallized top surface is the same.

A liquid crystal electrooptical cell includes a working electrode comprising a conductive material and a redox-active material disposed on at least a portion of the first electrode, the redox-active material comprising at least one redox-active group; a counter electrode comprising a conductive material; a liquid crystal; and a salt. The first electrode and the second electrode define a space at least partially filled with the liquid crystal, and the salt is dispersed in the liquid crystal. The redox-active groups of the redox layer disposed on the surface of the first electrode contact the liquid crystal in the space between the first and second electrodes.

Preferred liquid crystal electrooptical cells include a spacer material such as a film or microspheres that separates the first electrode from the second electrode. In yet other preferred liquid crystal electrooptical cells, the liquid crystal further includes a redox mediator. Still other preferred liquid crystal electrooptical cells are those in which the first electrode is a metallized top surface of a substrate. Still other preferred liquid crystal electrooptical cells are those in which the second electrode is a metal such as gold, silver, copper, nickel, palladium, or platinum. Other liquid crystal electrooptical cells are those in which the second electrode has any of the features of the second substrate described above. Yet other preferred liquid crystal electrooptical cells are those in which the redox-active layer disposed on at least one portion of a surface of the first electrode is disposed on a portion having a defined shape as described above.

A variety of films are suitable for use as spacing materials in the optical cells according to the invention as will be apparent to those skilled in the art. A preferred film spacing material is preferably made of a polymeric material such as Mylar® brand film or Saran® brand wrap. The film spacing material is typically placed between the top of the redox-active material and the surface of the second substrate. The spacing material may also be comprised of microspheres or rods of defined diameter that are dispersed into the liquid crystal so as to separate the two substrates forming the optical cell.

A kit for manufacturing a liquid crystal device includes a substrate having a surface having any of the features described above; a redox-active material having at least one redox-active group having any of the features described above; a liquid crystal having any of the features described above; and a salt having any of the features described above. Further kits may include a second substrate having any of the characteristics described above so that a liquid crystal cell or electrooptical cell may be manufactured using the kits. Preferred kits include instructions for manufacturing an electrooptical cell.

EXAMPLES

The following materials and methodologies were utilized in the examples discussed in greater detail below.

Materials

Glass microscope slides used in the experiments marked premium grade were obtained from Fisher Scientific (Los Angeles, Calif.). Glass slides were cleaned prior to use by sequentially treating with "piranha solution" (70% $H_2SO_4$/ 30% $H_2O_2$) and base solution (70% KOH, 30% $H_2O_2$) using nitrogen to provide agitation (1 hour at 50° C.). "Piranha solution" should be handled with extreme caution because it reacts violently with organic materials and should not be stored in closed containers. The slides were then rinsed thoroughly in deionized water, ethanol and then methanol, and dried under a stream of nitrogen. Prior to use, the clean substrates were stored in an oven heated at 110° C. for at least 3 hours.

Figure 1:
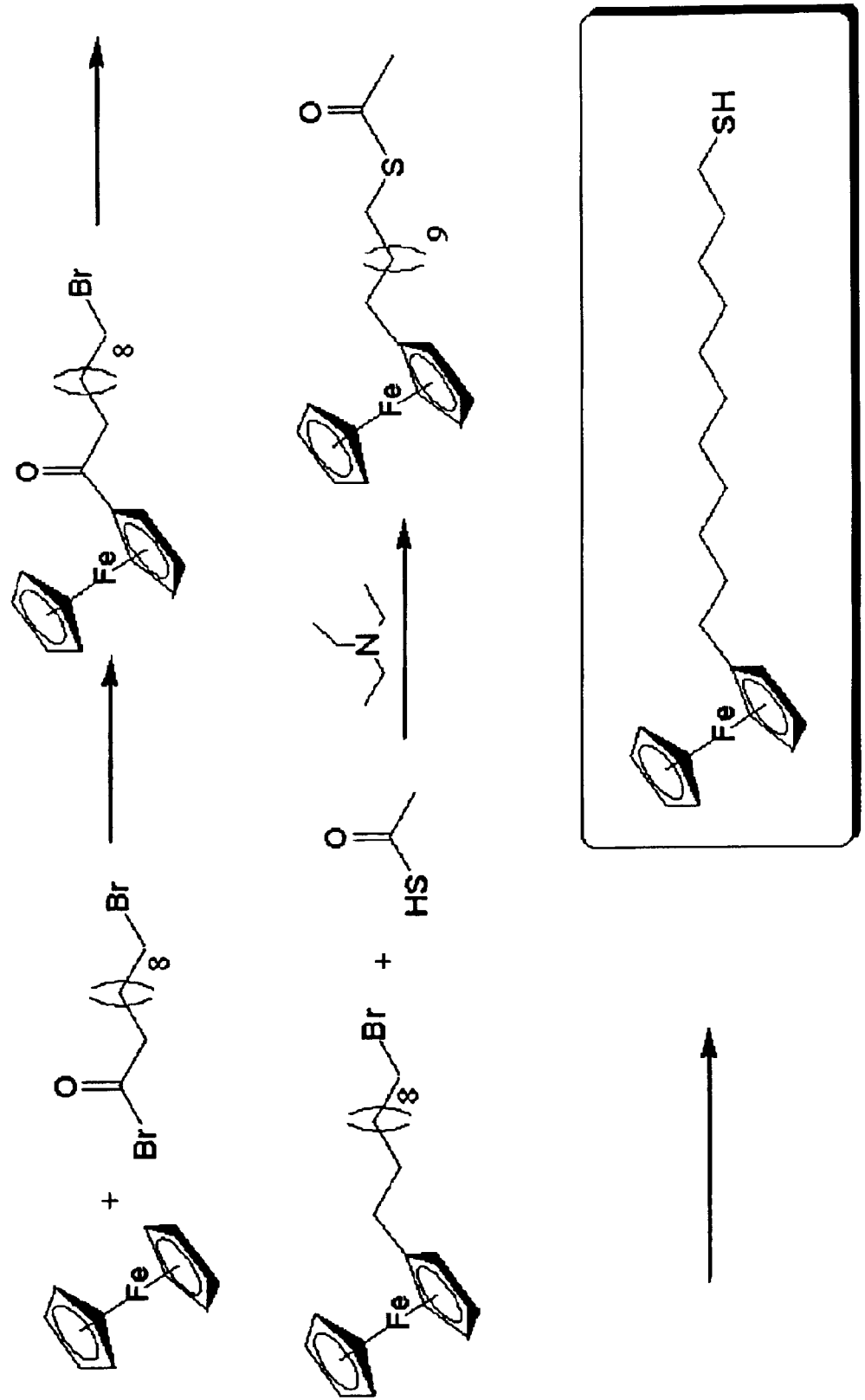
FIG. 1 is a schematic diagram of a synthesis scheme.

The synthesis of ferrocene-terminated alkanethiols such as 11-ferrocenyl-undecane-1-thiol was performed using a simple synthesis as shown in FIG. 1. Friedel Crafts acylation of ferrocene with an acyl halide such as 11-bromoundecanoyl bromide was performed to afford an acylated ferrocene derivative such as 11-bromo-1-ferrocenyl-undecan-1-one. The 11-bromo-1-ferrocenyl-undecan-1-one was then reduced with lithium aluminum hydride and aluminum trichloride to afford 11-bromoundecyl-ferrocene, followed by a SN2 reaction with mercaptoacetic acid to give the corresponding mercaptoester—mercaptoacetic acid S-(11-phenyl-undecyl) ester. The final product, 11-ferrocenyl-undecane-1-thiol, was obtained by acidic hydrolysis of the mercaptoester in reflux. See M. D. Collard; M. A. Fox, *Langmuir*, 7, 1192 (1991) and T. Kondo; S. Horiuchi; I. Yagi; and K. Uosaki, *Journal of the American Chemical Society*, 121, 391 (1999). Ferrocene (dicyclopentadienyliron) is commercially available from various suppliers including Aldrich Chemical (Milwaukee, Wis.). Halo-substituted acyl halides such as 11-bromoundecanoyl bromide are also commercially available or may be synthesized from commercially available halo-substituted carboxylic acids such as 11-bromoundecanoic acid which is commercially available from suppliers such as Aldrich Chemical (Milwaukee, Wis.) using standard procedures known to those of skill in the art.

Various alkanethiols such as, but not limited to, 1-hexadecanethiol are commercially available from various suppliers such as Aldrich Chemical (Milwaukee, Wis.). The nematic liquid crystal, 4-cyano-4'-pentylbiphenyl (5CB) ($T_{ni}$=34.5° C.), manufactured by BDH, was purchased from EM Industries (Hawthorne, N.Y.). Titanium (99.999%) and gold (99.999%) were purchased from Advanced Materials (Spring Valley, N.Y.). Buffer solutions were prepared using analytical grade commercially available reagents.

Chemical Oxidation of Ferrocene-Terminated SAM in Liquid Crystal Cell

Experiments were conducted to ascertain whether oxidation of ferrocene to the ferrocenium ion would alter the orientation of a liquid crystal on a SAM formed from an alkanethiol that includes the ferrocene group. Liquid crystal cells were assembled using two SAMs (denoted below as SAM A and SAM B for convenience). Both SAMs were formed on gold films deposited on glass substrates with no preferred angle or direction of incidence. The thickness of each of the gold films was approximately 20 nm. A titanium layer with a thickness of approximately 8 nm was deposited on the glass substrates prior to depositing the gold, and the titanium was used to promote adhesion of the gold to the glass substrate.

SAM A was formed by immersing a glass substrate with a gold film into a 1 mM ethanolic solution of 11-ferrocenyl-undecane-1-thiol for 2 hours. SAM B was a patterned SAM formed using microcontact printing techniques. First, a PDMS stamp, prepared using standard procedures, was used to microcontact print a SAM formed from hexadecanethiol on the surface of the gold film. The areas of the gold film that were functionalized with the hexadecanethiol were circular in shape, the circles having a diameter of 150 µm. The regions of the gold films between the circles that were not functionalized with hexadecanethiol were derivatized by reaction with 11-ferrocenyl-undecane-1-thiol. This was achieved by immersing the substrates with the gold film into an ethanolic solution of 1 mM 11-ferrocenyl-undecane-1-thiol for about 12 hours.

SAMs A and B were clamped together using a bulldog clip, with the SAMs facing each other. Mylar® brand film was placed between the two SAMs and was thus used as a spacing material between the two SAMs. The thickness of the spacing material in this particular case was 12 µm. The spacing material was obtained from Dupont Company (Wilmington, Del.).

In one experiment, the cavity between the two SAMs was filled with 4-cyano-4'-pentylbiphenyl (5CB) heated into its isotropic phase (approximately 37° C.). The liquid crystal cell was then allowed to cool to room temperature and observed under a polarizing microscope with cross polars. Inspection of the image revealed little contrast between the patterned regions of the surface. The orientation of the liquid crystal was parallel to the surface of the SAM and with a random azimuthal direction.

Figure 2:
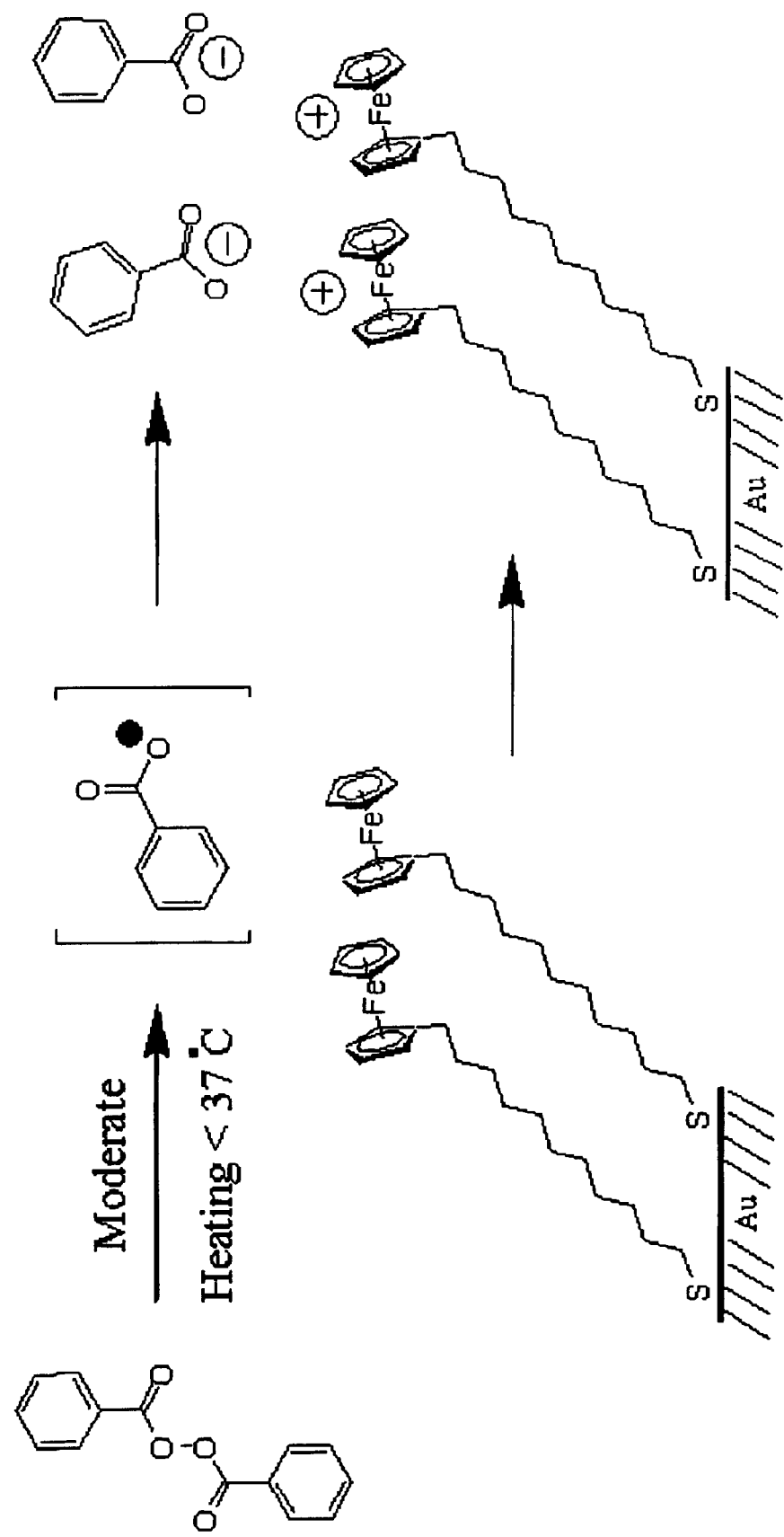
FIG. 2 is a schematic diagram showing how benzoyl peroxide oxidizes the ferrocene groups of a self-assembled monolayer (SAM) formed from ferrocenylalkanethiol to form the ferrocenium ion.
Figure 4A:
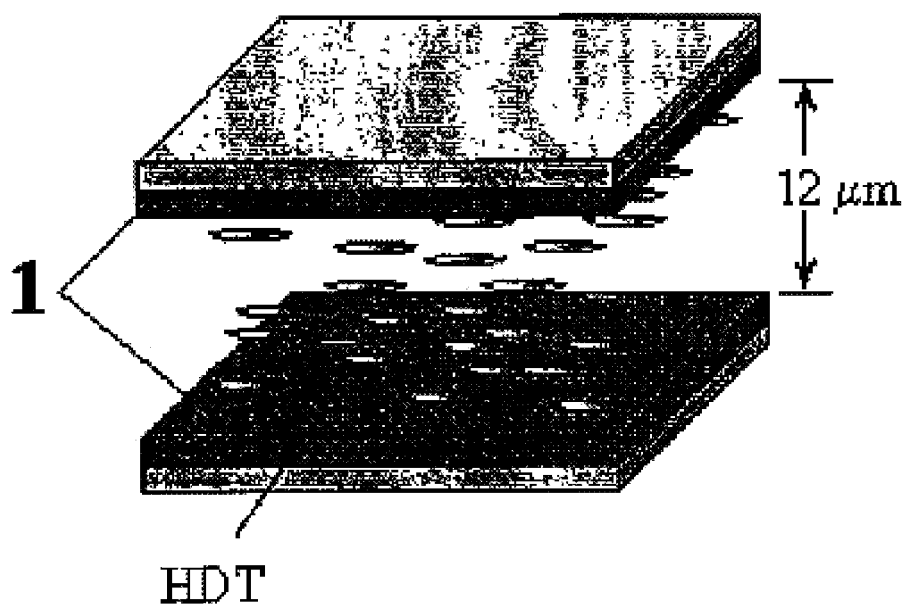
FIGS. 4A and 4B are schematic diagrams showing liquid crystal cells containing 5CB before (FIG. 4A) and after (FIG. 4B) oxidation. The lower surfaces were formed using microcontact printing to produce circular areas with SAMs formed from 1-hexadecanethiol (HDT) while the other areas on the lower surfaces are SAMs formed from 11-ferrocenyl-1-undecanethiol.
Figure 4B:
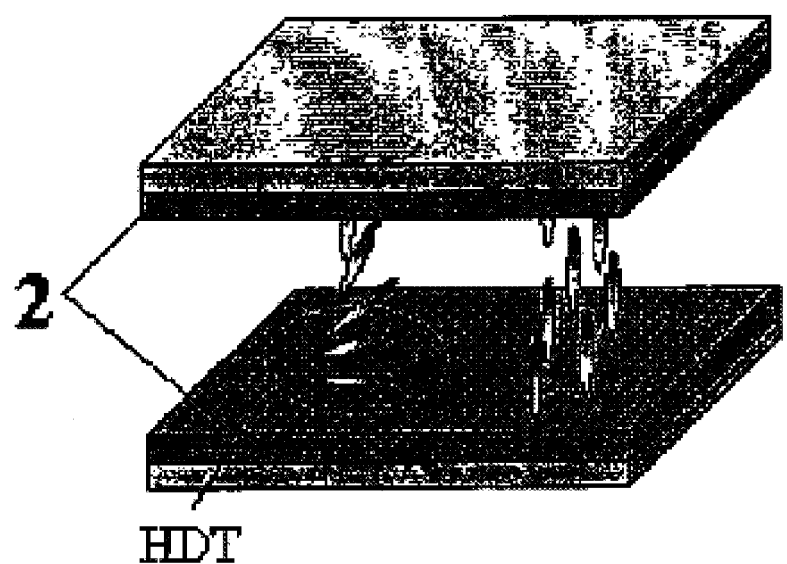
Figure 5A:
FIGS. 5A and 5B are scanned images through an optical microscope with cross-polarizers of the optical texture of the liquid crystal cells respectively shown in FIGS. 4A and 4B.
Figure 5B:
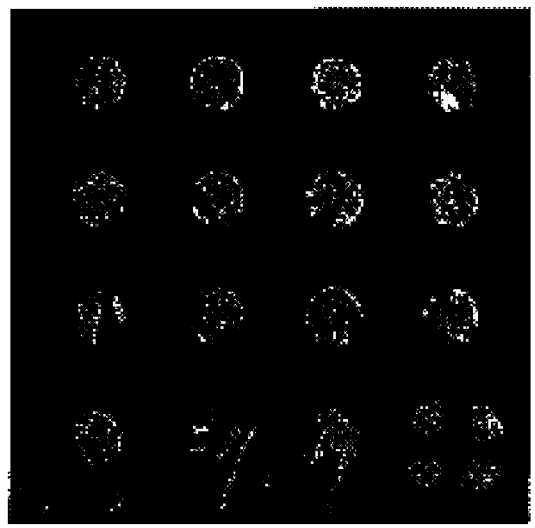

In a second experiment, 20 mM benzoyl peroxide was dissolved into the 5CB prior to injection of the 5CB into a liquid crystal cell formed using SAMs A and B. Benzoyl peroxide oxidizes the ferrocene of the SAM to the ferrocenium ion as shown in FIG. 2. In contrast to the experiment without benzoyl peroxide, when 20 mM benzoyl peroxide was dissolved in 5CB, the orientation of the liquid crystal was observed to be perpendicular to the surface of the SAMs (See FIG. 3). This was determined by (1) the extinction of light between crossed polars; (2) the fact that no modulation in the intensity of transmitted light occurred upon rotation of the sample between crossed polars, and (3) the presence of a "cross" upon conoscopic illumination of the sample. The 5CB was not perpendicular in regions where it contacted the SAM formed from hexadecanethiol. A schematic diagram of the liquid crystal cell prior to exposure to benzoyl peroxide is shown in FIG. 4A, and a scanned image through an optical microscope with cross-polarizers of the cell is shown in FIG. 5A. A schematic diagram of the liquid crystal cell after exposure to benzoyl peroxide is shown in FIG. 4B, and a scanned image through an optical microscope with cross-polarizers of the cell is shown in FIG. 5B. As shown in FIG. 5B, reaction of the benzoyl peroxide with the ferrocene-containing SAM produces an orientational shift in the liquid crystal that is easily visualized where the dark regions are those that contain the ferrocene-containing SAM and the lift areas are those that contain SAMs formed from the 1-hexadecanethiol (HDT).

Figure 6:
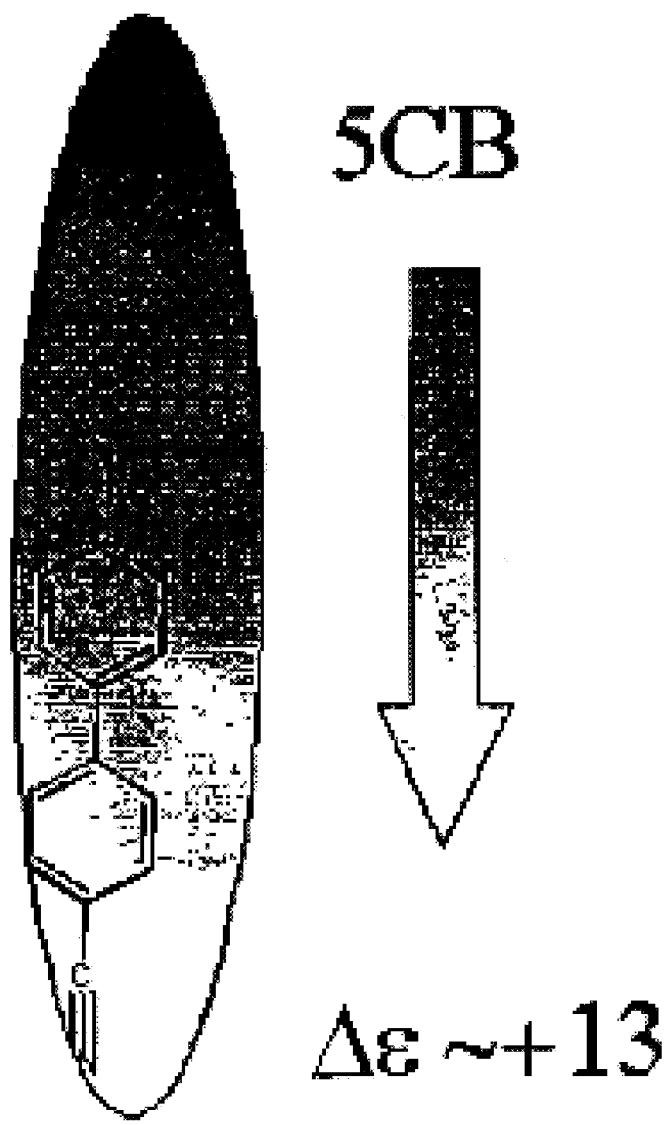
FIG. 6 is a schematic diagram showing that the dipole moment of 5CB is parallel to the long axis of the molecule.
Figure 10:
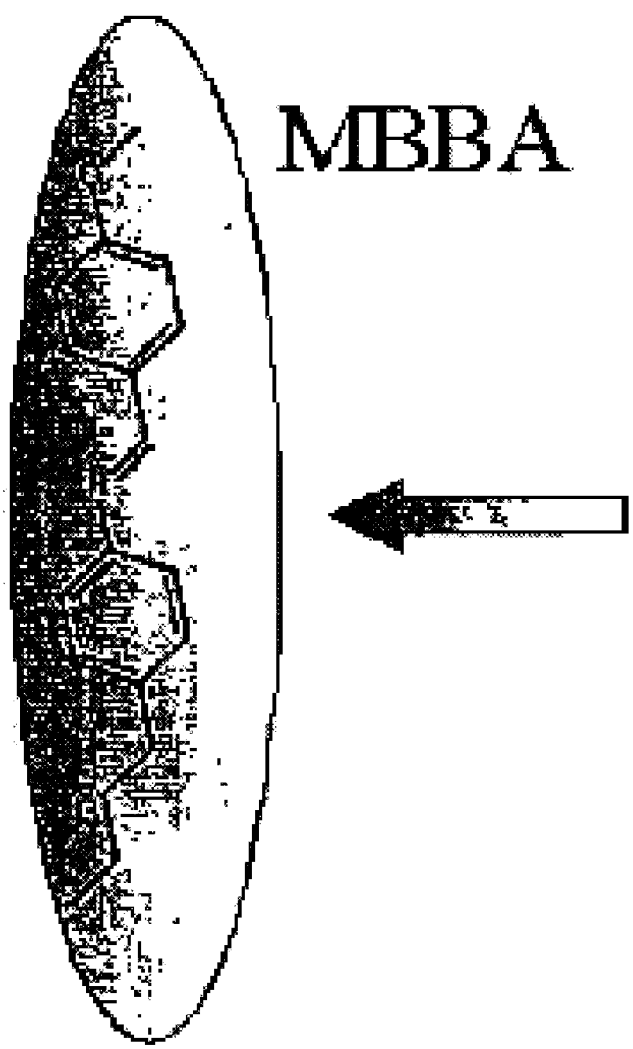
FIG. 10 is a schematic diagram showing that the dipole moment of MBBA is perpendicular to the long axis of the molecule.

Because benzoyl peroxide is known to oxidize ferrocene and ferrocenyl groups, it was concluded that the oxidation of ferrocene to the ferrocenium ion leads to a planar to homeotropic orientational transition of 5CB. Because 5CB has a positive dielectric anisotropy (See FIG. 6, the dipole moment is parallel to the long axis of the molecule), the homeotropic orientation is consistent with the effects of an electric field near the surface that is generated by the surface-immobilized ferrocenium ions. This proposition is supported by the experiments described below based on n-(p-methoxy-benzylidene)-p-n-butylamine (MBBA), which has a negative dielectric anisotropy as shown in FIG. 10 indicating the dipole moment is perpendicular to the large axis of the molecule.

Co-Injection of Liquid Crystal in Cells

Figure 7:
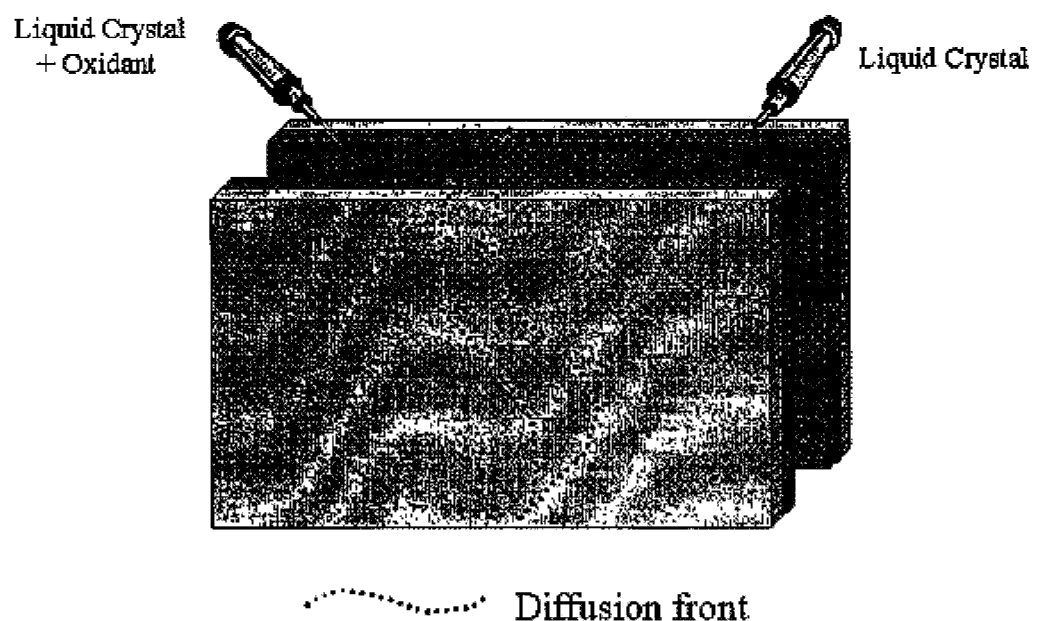
FIG. 7 is a schematic diagram showing how a liquid crystal and an oxidizing agent were injected into one portion of a liquid crystal cell and liquid crystal without the oxidizing agent was injected into an other portion of the liquid crystal.

Liquid crystals (5CB or MBBA) with and without benzoyl peroxide (20 mM) were co-injected simultaneously from either end of a liquid crystal cell formed using two SAMs of type A as shown in FIG. 7. This procedure lead to the formation of a liquid crystal in which there existed a spatial gradient in the concentration of the benzoyl peroxide (from 20 mM to zero) across the cell.

Analysis of Diffusion Front Using MBBA

Figure 8A:
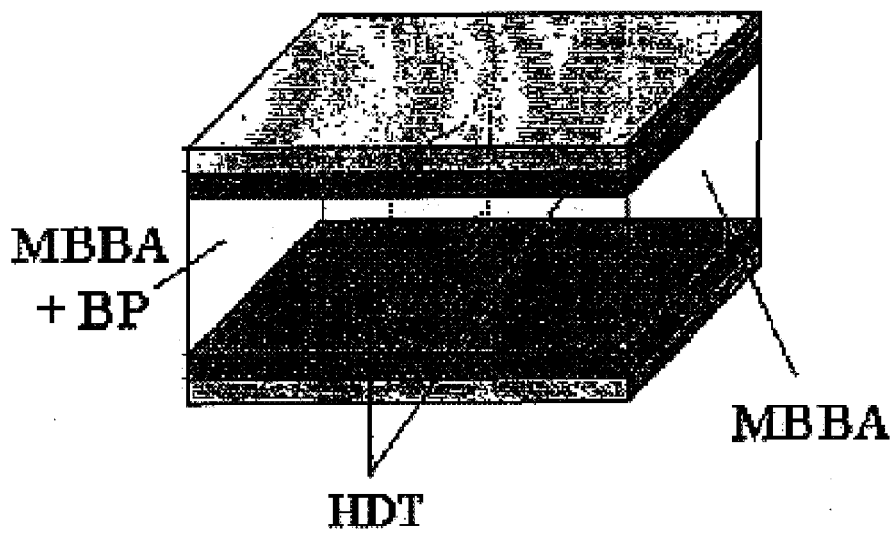
FIGS. 8A and 8B are schematic diagrams showing liquid crystal cells formed with SAMs formed solely from HDT (FIG. 8A) and with SAMs formed with 11-ferrocenyl-1-undecanethiol (FIG. 8B). The left side of the liquid crystal cells of FIGS. 8A and 8B were injected with MBBA and benzoyl peroxide and the right side were injected only with the MBBA liquid crystal.
Figure 8B:
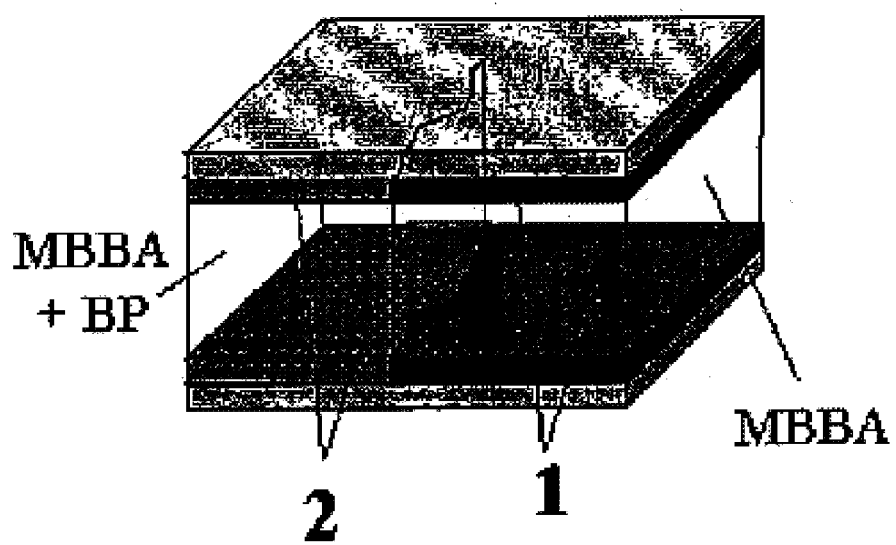

Liquid crystal cells prepared as described above were filled with MBBA as schematically shown in FIG. 8A (SAMs prepared only with 1-hexadecanethiol) and FIG. 8B (SAMs prepared with tethered ferrocene alkanethiol). Scanned images through an optical microscope with cross-polarizers of the liquid crystal cells prepared as described above are shown in FIG. 9A (SAMs prepared only with 1-hexadecanethiol) and FIG. 9B (SAMs prepared with tethered ferrocene alkanethiol). In the region of the liquid crystal cell containing MBBA with 20 mM of benzoyl peroxide (the left side as shown in FIGS. 8A, 8B, 9A, and 9B), the appearance of the liquid crystal was non-uniform and planar. The fact that MBBA did not assume a homeotropic orientation is consistent with the mechanism of influence of oxidation of the ferrocene-terminated monolayer described above. MBBA has a negative dielectric anisotropy and thus it will not be poled perpendicular to the surface by the electric field associated with the ferrocenium on the surface (See FIG. 10).

Figure 9A:
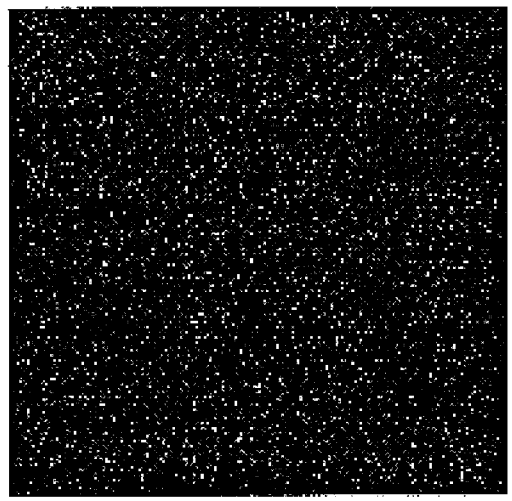
FIGS. 9A and 9B show scanned images through an optical microscope with cross-polarizers of the optical texture of the liquid crystal cells respectively shown in FIGS. 8A and 8B. The larger grain size on the right of FIG. 9B compared to that on the left side of FIG. 9B indicates the stronger anchoring of the MBBA to the ferrocenium surface.
Figure 9B:
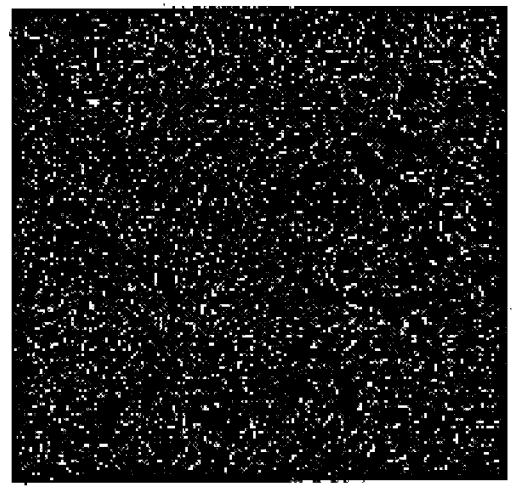

The characteristic grain-size of the MBBA in the benzoyl peroxide-free region of the cell was larger than the grain-size of the MBBA in the region of the cell that contained benzoyl peroxide (See FIG. 9B where the upper left side was the region with the MBBA and benzoyl peroxide and the right side was the region of the liquid crystal cell that only contained MBBA). This observation supports the proposed electrostatic mechanism described above because the anchoring energy causing the planar orientation of the MBBA will be larger in the region of the cell in which the ferrocenium exists. It is well known that the grain-size of a non-uniformly oriented liquid crystal increases with decreasing anchoring energy.

FIG. 9A shows that a liquid crystal cell with surfaces formed from hexadecanethiol does not give rise to homeotropic anchoring when benzoyl peroxide is present in the MBBA. The grain sizes were uniform in regions that contained MBBA without benzoyl peroxide and regions that contained MBBA with benzoyl peroxide.

Analysis of Diffusion Front of Two Liquid Crystal Solution

Figure 11:
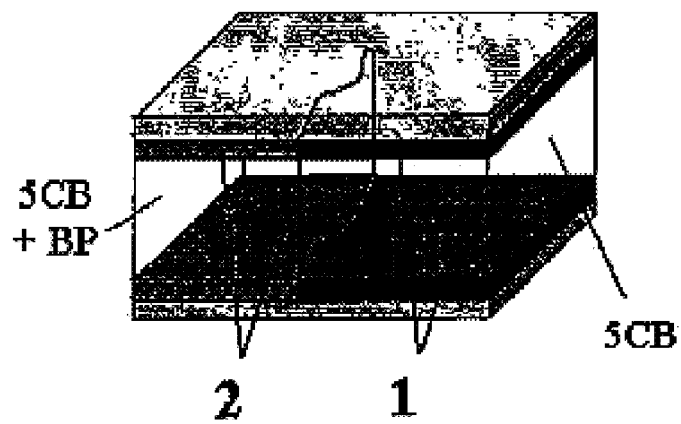
FIG. 11 is a schematic diagram of a liquid crystal cell formed with SAMs formed with 11-ferrocenyl-1-undecanethiol (FIG. 8B). The left side of the liquid crystal cell was injected with 5CB and benzoyl peroxide and the right side was injected only with the liquid crystal.
Figure 12:
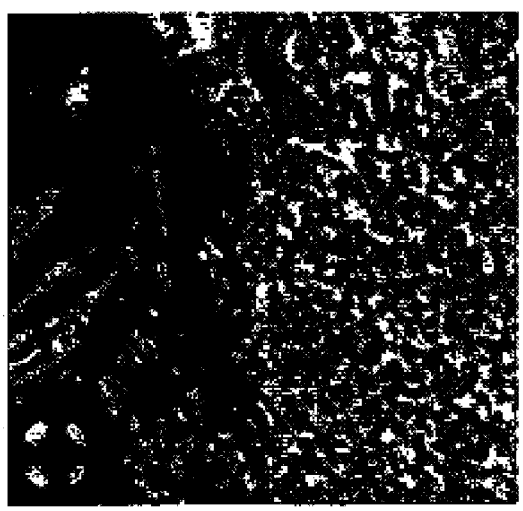
FIG. 12 is a scanned image through an optical microscope with cross-polarizers of the optical texture of the liquid crystal schematically shown in FIG. 11. The dark left side of the cell is the area that was injected with the 5CB and the benzoyl peroxide while the light right side of the cell is that injected only with the 5CB. The difference in the optical textures is a result of the oxidation of the ferrocene on the left side of the cell which produce a shift in the orientation of the 5CB.

An experiment similar to that described above, was carried out using 5CB in place of MBBA. A schematic diagram of the liquid crystal cell is shown in FIG. 11. FIG. 12 is a scanned image through an optical microscope with cross-polarizers of the liquid crystal cell showing the regions with 5CB and benzoyl peroxide (the left side) and regions with 5CB but without benzoyl peroxide (the right side. In this case, however, the region of the 5CB containing the benzoyl peroxide was observed to assume a homeotropic orientation (left side of FIG. 12). In contrast, the region of the liquid crystal cell not containing 5CB was planar (right side of FIG. 12). The homeotropic orientation was confirmed using conoscopy which is also shown in FIG. 12 in the lower left corner. A characteristic cross was observed under conoscopic illumination. The homeotropic orientation of the 5CB was observed at 31.5° C.

The results of this experiment confirm the observation that oxidation of the ferrocene-terminated monolayer to ferrocenium leads to a planar-to-homeotropic orientation transition of 5CB.

Electrooptical Cell for Liquid Crystal Display

A series of experiments were performed to demonstrate that electrochemical oxidation of the ferrocene-terminated SAM to a ferrocenium terminated SAM could lead to a change in orientation of the 5CB.

Figure 13:
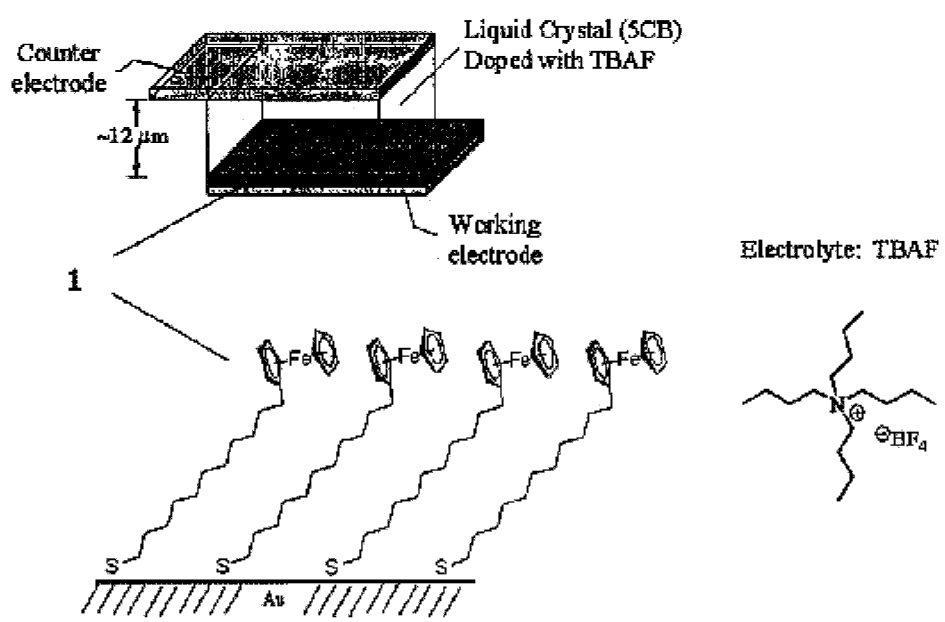
FIG. 13 is a schematic diagram of an electrooptical cell that includes a counter electrode, a working electrode with a SAM formed from a ferrocenylalkanethiol, and a liquid crystal doped with tetrabutylammonium tetrafluoroborate (TBAF).

The electrooptical cells included a working electrode made of ferrocene-terminated SAM on gold film on glass substrates and a counter electrode made of bare gold film on glass substrates. The gold films were uniformly deposited (same as those used above in the experiments based on chemical oxidation). A schematic diagram of the cell is shown in FIG. 13. The thickness of the liquid crystal films was 12 $\mu$m.

All experiments involving the electrochemical oxidation used a salt. The salt was 35 mM of tetrabutylammonium tetrafluoroborate (TBAF) although various other salts may be employed. The liquid crystal used in these experiments was 5CB.

Electrochemistry of SAMs Using 5CB

Figure 14:
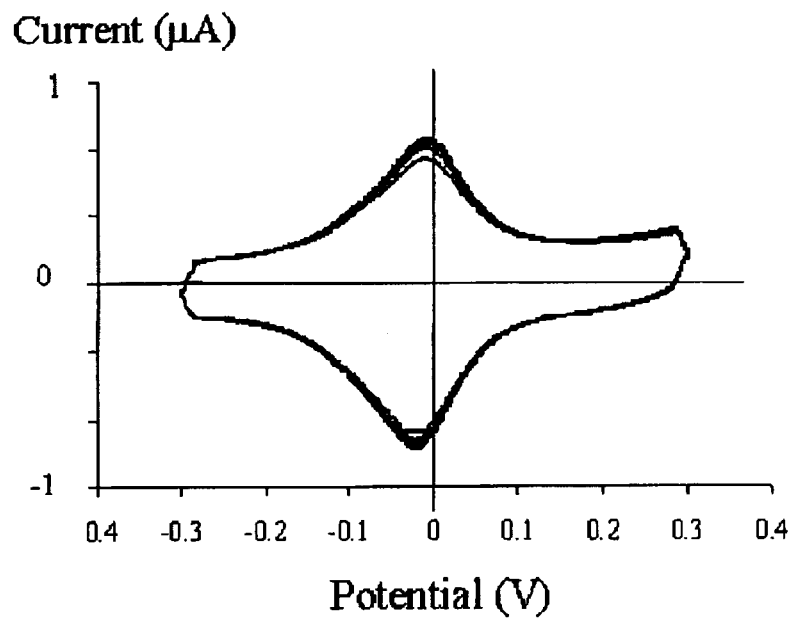
FIG. 14 is a cyclic voltammogram showing the oxidation and reduction of the ferrocene groups in a SAM formed from 11-ferrocenyl-1-undecanethiol.
Figure 15:
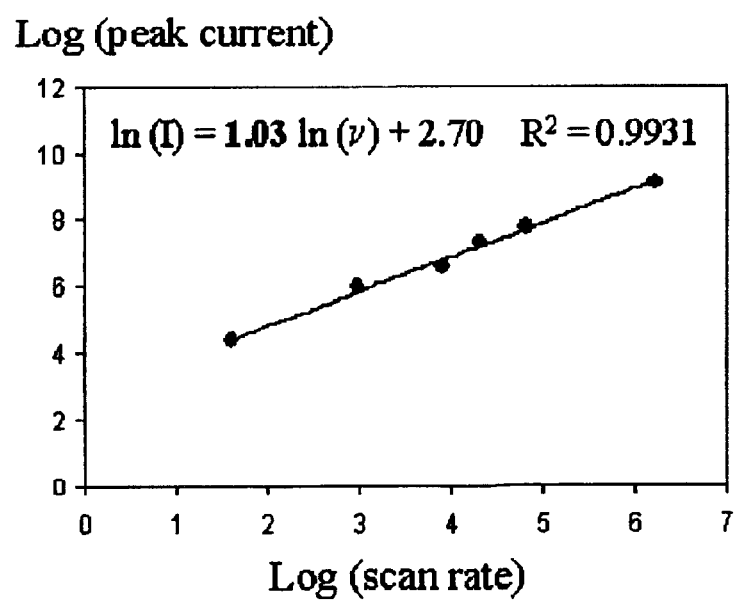
FIG. 15 is a plot of the logarithm of the peak current versus the logarithm of the scan rate for the cyclic voltammogram of FIG. 14.

The reversible redox chemistry of ferrocene and ferrocenium tethered on SAMs in liquid crystal (5CB with 35 mM of TBAF) cells was characterized using cyclic voltammetry as shown in FIG. 14. The cyclic voltammograms were well-behaved, showing both oxidative and reductive waves at approximately 0 V. The cyclic voltammogram measures the current from stripping electrons off ferrocene when an oxidizing potential is applied. When the potential sweeps back to a reducing potential, the ferrocenium ion is reduced to ferrocene as electrons are placed back in the system. The cyclic voltammogram also shows that oxidation is pretty much complete at 100 mV showing that lower potentials may be used in this system. This is determined by integrating the peak in the cyclic voltammogram. Examination of the dependence of the peak current on the scan rate confirmed that these waves of current corresponded to a surface-confined redox-active species. For a surface-confined redox-active species, the relationship between the logarithm of the peak current and scan rate should be 1.0. A value of 1.03 was measured as shown in FIG. 15, thus confirming that the oxidative wave is due to a surface-confined ferrocene species. A diffusing redox-active species would give rise to a value of 0.5. The cyclic voltammograms were measured over tens of cycles and observed to be reversible. Thus the ferrocene tethered on the alkanethiol of the SAM is stable to oxidation and reduction in the presence of the 5CB.

In Situ Electrochemical Control of Liquid Crystal Orientation

Figure 16:
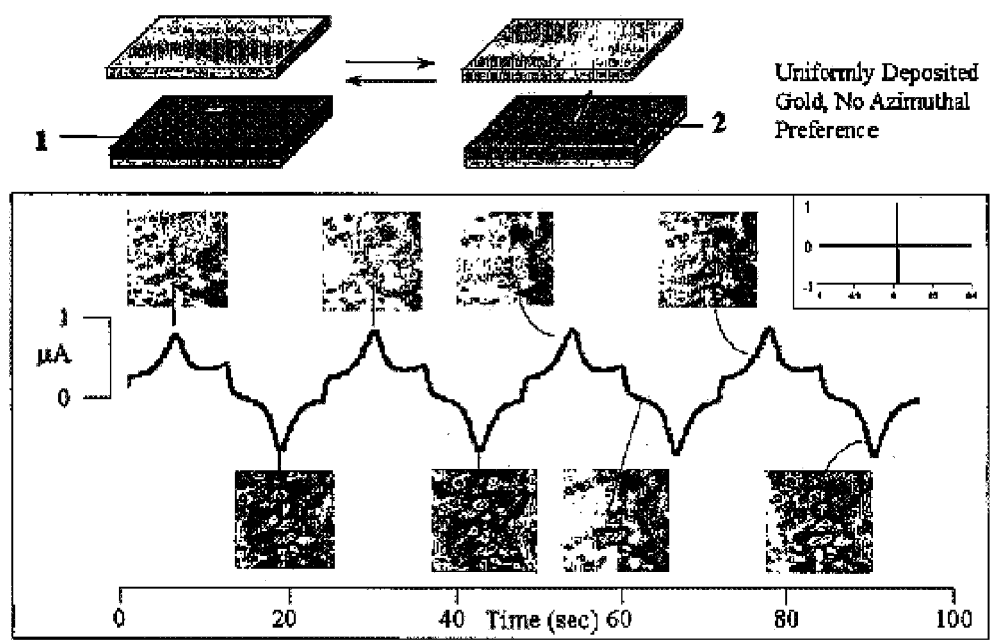
FIG. 16 is a schematic diagram showing the change in the orientation of 5CB in a liquid crystal cell formed from a counter electrode and working electrode with uniformly deposited gold with no azimuthal preference with the working electrode including a SAM formed from 11-ferrocenyl-1-undecanethiol.

The optical appearance of the liquid crystal (crossed polars) and the cyclic voltammogram were measured. Whereas the appearance of the liquid crystal was bright and yellow when the SAM was oxidized, the appearance of the liquid crystal turned dark and green when the ferrocene was in its reduced state within the SAM as shown in FIG. 16. The change in color reflects a change in the orientation of the liquid crystal on the ferrocene-terminated SAM. The change in orientation of the liquid crystal was reversible over a number of cycles, and the intermediate appearance of the liquid crystal was observed at intermediate stages of the oxidation of the SAM.

Azimuthal Orientation of 5CB with 35 mM TBAF with Obliquely Deposited Gold Film

Figure 17:
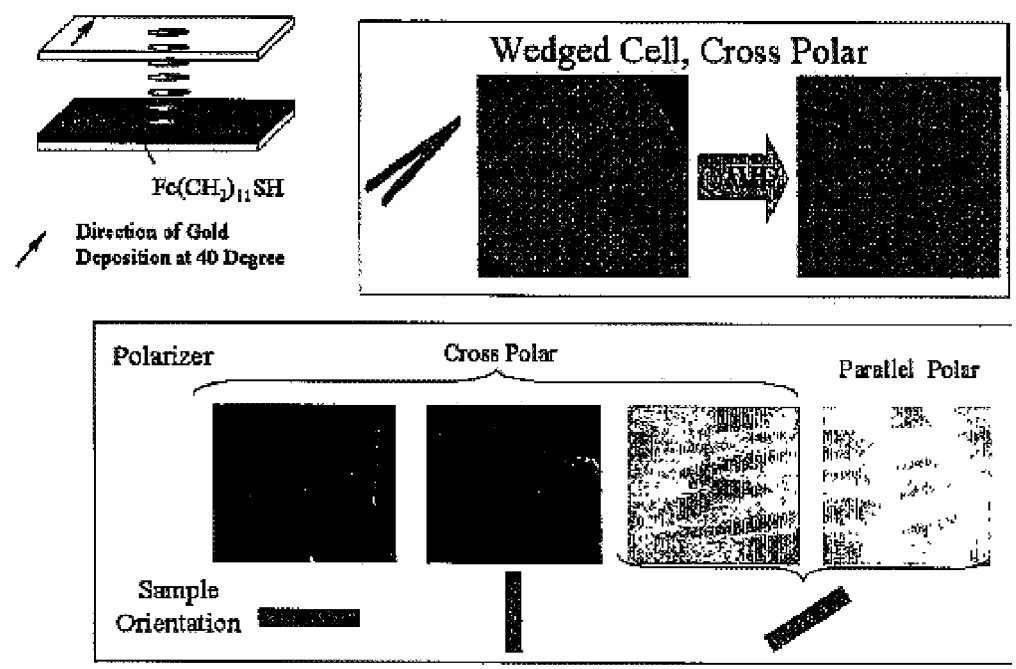
FIG. 17 is a schematic diagram showing the change in the orientation of 5CB in a liquid crystal cell formed from a counter electrode and working electrode gold films deposited at an angle of 40° from the normal and a fixed azimuthal direction of incidence with the working electrode including a SAM formed from 11-ferrocenyl-1-undecanethiol.

The azimuthal orientation of 5CB containing 35 mM of TBAF was measured and determined to be parallel to the plane of the gold film and perpendicular to the direction of deposition of the gold film when using gold films deposited at an angle of incidence of 40 degrees from the normal (and a fixed azimuthal direction of incidence). The gold films were deposited at 0.02 nm/sec in an electron beam evaporator (Tek-Vac, NJ). A thin film of Ti was used to promote adhesion of the gold to the glass substrate. The thickness of the gold was 20 nm. SAMs of type A were formed on these gold films using procedures described above. By inserting a quarter wave plate into the optical path of a polarized microscope, it was determined that the 5CB was oriented in an azimuthal orientation. This was determined by analyzing the change in the interference colors as shown in FIG. 17.

Figure 18:
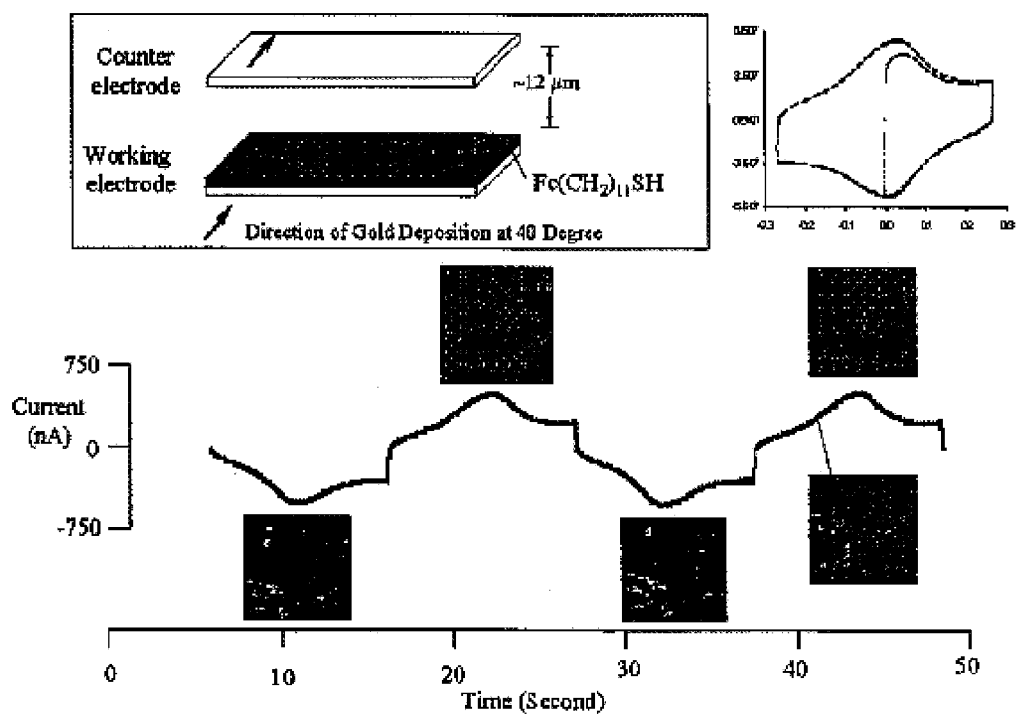
FIG. 18 is a schematic diagram showing a liquid crystal cell formed from a counter electrode (bare gold deposited at 40° from normal) and working electrode including a gold film deposited at an angle of 40° from the normal and including a SAM formed from 11-ferrocenyl-1-undecanethiol.

Twisted Nematic Liquid Crystals by Electrochemical Control as Liquid Crystal Displays A liquid crystal cell was prepared that included a counter electrode (bare gold, deposited at 40° from normal) and a SAM of type A formed on the obliquely deposited gold films. The 5CB contained 35 mM TBAF. The thickness of the film of liquid crystal was 12 µm. The optical appearance of the liquid crystal cell was monitored between crossed polars as oxidizing and reducing potentials of +/−300 mV were applied to the working electrode as shown in FIG. 18. The counter and working electrodes were assembled parallel to each other (the direction of deposition of gold was the same) as shown in FIG. 18. When an oxidizing potential was applied to the working electrode, the liquid crystal appeared uniformly bright. When a reducing potential was applied to the working electrode the liquid crystal appeared uniformly dark as shown in FIG. 18. This observation suggests that the azimuthal orientation of the liquid crystal changed to the SAM of type A when the SAM was oxidized. The change in orientation of the liquid crystal induced by the application of the potentials was found to be reversible as shown in FIG. 18 by the cyclic voltammograms.

Effect of Applied Potential on Twisted Nematic Liquid Crystals

Figure 19:
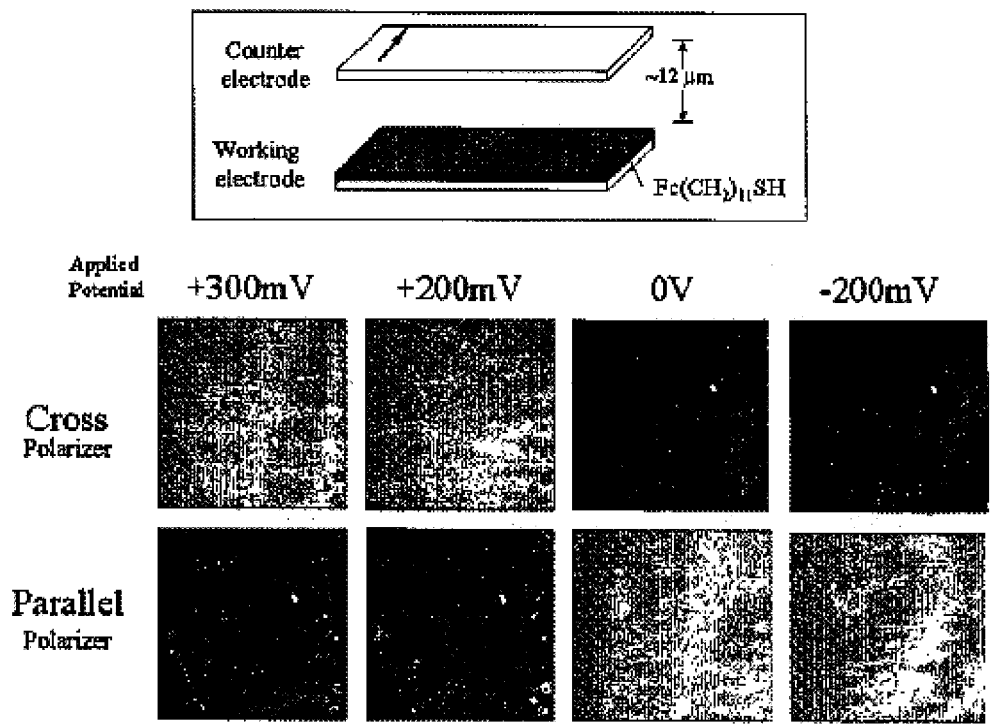
FIG. 19 is a schematic diagram of a liquid crystal cell identical to that of FIG. 18 and scanned images through an optical microscope with cross-polarizers of the optical textures of the cell between parallel and cross polars as various potentials were applied to the working electrode.
Figure 20:
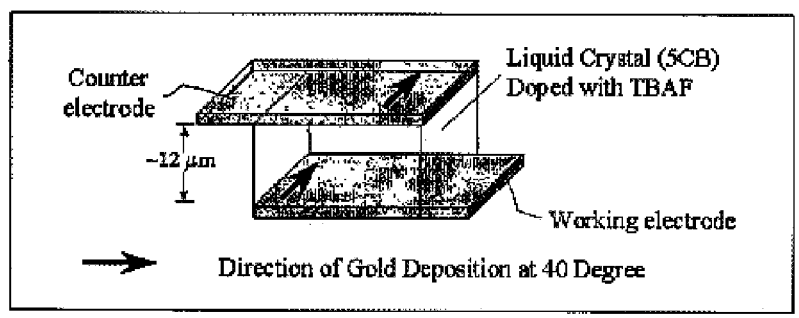
FIG. 20 is a schematic diagram of a liquid crystal cell formed with a working electrode and a counterelectrode formed from gold deposited at an angle of 40° from the normal, but with no SAM. The liquid crystal was filled with 5CB with TBAF. The scanned images show that no change of appearance in the optical texture of the cell occurred in the absence of the ferrocene groups.
Figure 20:
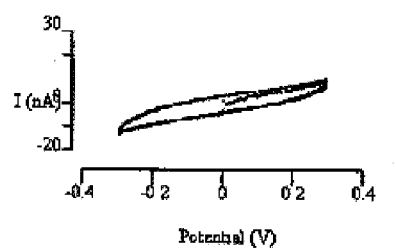
Figure 20:
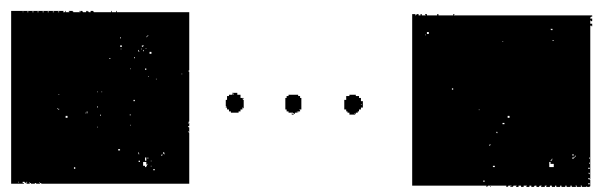

A second liquid crystal cell was prepared that was identical to that used to prepare the liquid crystal cell of FIG. 18. In the second experiment, the appearance of the liquid crystal between parallel and crossed polarizers was observed as specific values of potential were applied to the working electrode (see FIG. 19). Whereas an oxidizing potential of +200 mV caused the liquid crystal to appear bright between crossed polarizers, the liquid crystal appeared dark between parallel polarizers. This result is consistent with the presence of a 90° twist distortion across the liquid crystal cell. In contrast, when the potential applied to the working electrode was −200 mV, the liquid crystal appeared bright between parallel polars and dark between crossed polars. This experiment is consistent with a uniform (untwisted) orientation of liquid crystal within the cell. These two results, when combined, lead to the conclusion that the application of +200 mV to the working electrode induce a 90° twist distortion within the liquid crystal cell. It is believed that this twist distortion results from the presence of an in-plane component of an electric field near the gold surface. This in-plane component may result from the nanometer-scale topography of the obliquely deposited gold film. As shown in FIG. 19, application of 0 V to the working electrode lead to formation of an untwisted cell whereas +300 mV lead to formation of a 90° twist distortion. The electrochemically-induced twist distortion in the liquid crystal was not observed when the SAM of type A was replaced by a SAM formed from hexadecanethiol. A liquid crystal cell formed without the ferrocene group but otherwise identical to that shown in FIG. 19 did not exhibit any change in optical texture on application of potential as shown in FIG. 20.

Estimated Response Time of Electrochemical Switch

Figure 21:
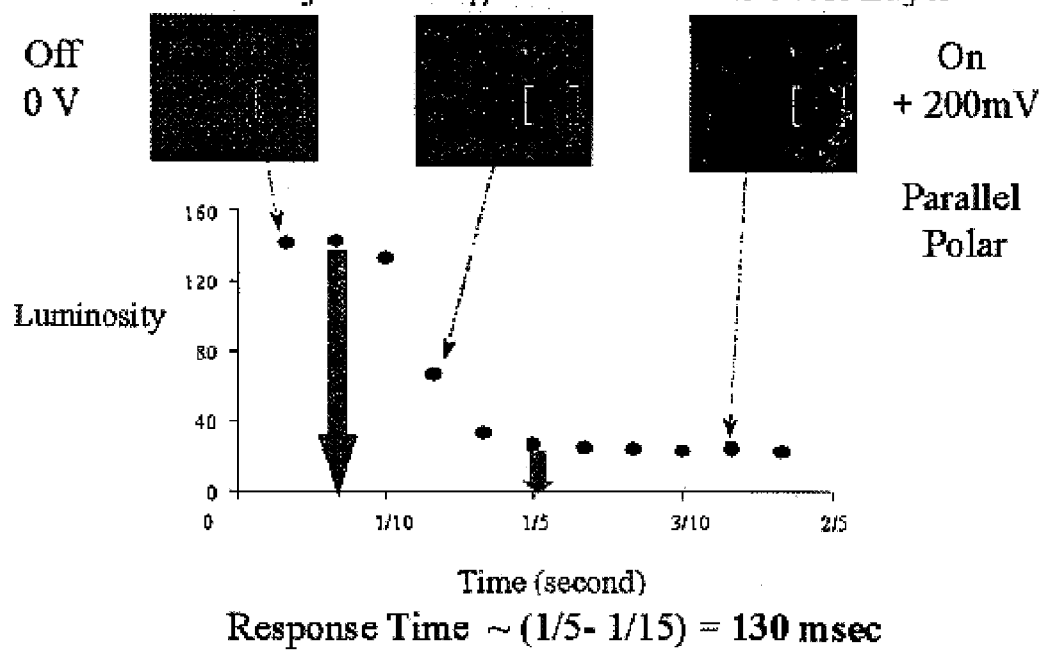
FIG. 21 is a graph of the luminosity versus the elapsed time in seconds after application of a potential of +200 mV to a liquid crystal cell containing 5CB and TBAF and containing a SAM formed from 11-ferrocenyl-1-undecanethiol.

The response time of the electrochemical switch of the liquid crystal orientation was measured by recording on video the time-dependent response of the optical appearance of the liquid crystal following a step change in the potential from 0 to +200 mV as shown in FIG. 21. The response time of the liquid crystal was estimated to be approximately 130 milliseconds. This response time can be improved (i.e. shortened) by various methods such as increasing slightly the applied potential or choosing other liquid crystals with faster response times to the electric field.

Preparation of Switches with other SAMs

A variety of ferrocenylalkanethiols are prepared using procedures similar to those described for the preparation of 11-ferrocenyl-undecane-1-thiol. Slides coated with metals including gold, copper, silver, and platinum are immersed in solutions of the ferrocenylalkanethiols using the method described above. This produces various SAMs that exhibit properties similar to those observed for SAMs prepared from 1-ferrocenyl-undecane-1-thiol. Examples of ferrocenylalkanethiols that are used include: 3-ferrocenyl-propane-1-thiol; 4-ferrocenyl-butane-1-thiol; 5-ferrocenyl-pentane-1-thiol; 6-ferrocenyl-hexane-1-thiol; 7-ferrocenyl-1-heptane-thiol; 8-ferrocenyl-1-octanethiol; 9-ferrocenyl-1-nonanethiol; 10-ferrocenyl-1-decanethiol; 12-ferrocenyl-1-dodecanethiol; 13-ferrocenyl-1-tridecanethiol; 14-ferrocenyl-1-tetradecanethiol; 15-ferrocenyl-1-pentadecanethiol, 16-ferrocenyl-1-hexadecanethiol, 17-ferrocenyl-1-heptadecanethiol, 18-ferrocenyl-1-octadecanethiol, 19-ferrocenyl-1-nonadecanethiol, and 20-ferrocenyl-1-eicosanethiol.

SAMs are also formed using any of the ferrocenylalkanethiols in conjunction with alkanethiols without ferrocene groups to form mixed SAMs. The mixed SAMs are constructed into liquid crystal cells using the methods described above. The liquid crystal cells are then filled with a liquid crystal with a dipole moment parallel to the long axis of the liquid crystal molecule in conjunction with a tetraalkylammonium tetrafluoroborate, hexafluorophosphate, or tetraphenylborate salt. Application of a chemical oxidizing agent or a potential of +200 mV or greater converts the ferrocene to the ferrocenium ion and results in a orientational transition of the liquid crystal that is visually detectable.

Preparation of Poly(vinylferrocene) Switches Using Liquid Crystals

Commercially available poly(vinylferrocene) is spin-coated onto an obliquely deposited gold film, and a liquid crystal cell is prepared using a counter electrode having the features described above and the poly(vinylferrocene)-coated gold in place of SAM A. The cell is filled with a liquid crystal such as 5CB that contains a salt such as TBAF. Application of a chemical oxidizing agent or a potential of +200 mV or greater converts the ferrocene to the ferrocenium ion and results in a orientational transition of the liquid crystal that is visually detectable.

In another experiment, poly(vinylferrocene) is coated on an indium tin oxide (ITO)-coated glass slide. The poly (vinylferrocene)-coated surface is then rubbed to induce topography for uniform anchoring of liquid crystal. The rubbing is accomplished using any method known to those skilled in the art. A liquid crystal cell is then prepared using the poly(vinylferrocene) in place of the SAM A and a glass slide with an obliquely deposited gold film as the counter electrode. Application of a chemical oxidizing agent or a potential of +200 mV or greater converts the ferrocene to the ferrocenium ion and results in a orientational transition of the liquid crystal that is visually detectable.

Preparation of Ferrocene-Containing Liquid Crystal Switches Using other Tethering Mechanisms A SAM is formed using mercaptopropylsulfonate on an obliquely deposited gold film on a glass slide. Next poly (allylamine) is adsorbed onto the negatively charged surface provided by the sulfonate groups of the SAM. The free amine groups of the poly(allylamine) is reacted with a ferrocene that contains an aldehyde group to tether the ferrocene to the poly(allylamine). The ferrocene-containing surface is then used in place of SAM A to form a liquid crystal cell using a counter electrode having the features described. The cell is filled with a liquid crystal such as 5CB that contains a salt such as TBAF. Application of a chemical oxidizing agent or a potential of +200 mV or greater converts the ferrocene to the ferrocenium ion and results in a orientational transition of the liquid crystal that is visually detectable.

The experiment described in the preceding paragraph is described, but the poly(allylamine) is rubbed after it has been adsorbed on the surface of the SAM. The rubbing produces topography that results in uniform anchoring of the liquid crystal.

Other methods of tethering ferrocene groups are used to produce surfaces for use in producing liquid crystal cells. In one such method, an aldehyde terminated SAM is formed and a polyamine is bonded to it. The polyamine is then reacted with a ferrocene that includes an aldehyde group to tether the ferrocene to the surface-bound polyamine. Other reactions such as Diels-Alder reactions may be used to tether redox-reactive species such as ferrocene to SAMs for use in producing liquid crystal cells.

It is understood that the invention is not limited to the embodiments set forth herein for illustration, but embraces all such forms thereof as come within the above description.

What is claimed is:

1. A liquid crystal switching device comprising:
   (a) a first substrate having a first surface;
   (b) a redox-active material disposed on a first portion of the first surface, the redox-active material comprising at least one redox-active group;
   (c) a liquid crystal disposed above the redox-active material; and
   (d) a salt dispersed in the liquid crystal, wherein the liquid crystal changes from a first orientation to a second orientation with respect to the first surface of the substrate when an oxidation state of the at least one redox-active group is changed from a first oxidation state to a second oxidation state.

2. The liquid crystal switching device of claim 1, wherein the liquid crystal changes from the second orientation back to the first orientation when the oxidation state of the at least one redox-active group is changed from the second oxidation state back to the first oxidation state.

3. The liquid crystal switching device of claim 1, wherein the first surface comprises at least one electrically conducting region.

4. The liquid crystal switching device of claim 3, wherein the at least one electrically conducting region is a metallized region.

5. The liquid crystal switching device of claim 4, wherein the metallized region comprises a metal selected from the group consisting of gold, silver, copper, nickel, palladium, platinum, and combinations thereof.

6. The liquid crystal switching device of claim 3, wherein the at least one electrically conducting region comprises an electrically conducting polymer or an electrically conducting metal oxide.

7. The liquid crystal switching device of claim 1, wherein the first surface comprises a semiconducting material or a non-electrically conducting material.

8. The liquid crystal switching device of claim 1, wherein the at least one redox-active group comprises a monocyclic or polycyclic aromatic group.

9. The liquid crystal switching device of claim 8, wherein the at least one redox-active group is selected from the group consisting of ferrocenes, derivatized ferrocenes, viologens, pyridines, bipyridines, metal meso porphyrins, quinones, hydroquinones, anthracenes, and combinations thereof.

10. The liquid crystal switching device of claim 1, wherein the at least one redox-active group is a ferrocene.

11. The liquid crystal switching device of claim 1, wherein the redox-active material comprises a polymer and the redox-active groups are pendant groups on the polymer.

12. The liquid crystal switching device of claim 11 wherein the polymer comprises poly(vinylferrocene).

13. The liquid crystal switching device of claim 1, wherein the redox-active material is a self-assembled monolayer comprising a plurality of molecules comprising the at least one redox-active group.

14. The liquid crystal switching device of claim 13 wherein the first surface comprises at least one metallized region and the self-assembled monolayer is formed by contacting a compound of the formula Fc—$(CH_2)n$—SH with the at least one metallized region, wherein Fc is ferrocene and n has a value ranging from 1 to 20.

15. The liquid crystal switching device of claim 1, wherein the first surface of the first substrate comprises a second portion and a second redox-active material is disposed on the second portion of the first surface, and further wherein the second redox-active material and the redox-active material possess different redox potentials.

16. The liquid crystal switching device of claim 1, wherein the liquid crystal is a nematic liquid crystal.

17. The liquid crystal switching device of claim 1, wherein the liquid crystal comprises 4-cyano-4'-pentylbiphenyl.

18. The liquid crystal switching device of claim 1, wherein the salt is a tetraalkylammonium salt, a metal halide salt, or an organic-inorganic hybrid salt comprising an organic encapsulated metal.

19. The liquid crystal switching device of claim 1, further comprising an oxidizing agent or a redox mediator dispersed in the liquid crystal.

20. The liquid crystal switching device of claim 1, further comprising, a second substrate having a second surface, wherein the second surface is disposed above the redox-active material to form a gap between the redox-active material and the second surface, and further wherein the liquid crystal is located within the gap.

21. The liquid crystal switching device of claim 20, further comprising a spacing material disposed between the first and the second substrates.

22. The liquid switching device of claim 21, wherein the spacing material comprises a polymeric film or microparticles.

23. The liquid crystal switching device of claim 20, wherein the second surface comprises at least one electrically conducting region.

24. The liquid crystal switching device of claim 23, wherein the at least one electrically conducting region of the second surface is a metallized region.

25. The liquid crystal switching device of claim 24, wherein the metallized region of the second surface comprises a metal selected from the group consisting of gold, silver, copper, nickel, palladium, platinum, and combinations thereof.

26. The liquid crystal switching device of claim 23, wherein the at least one electrically conducting region of the second surface comprises an electrically conducting polymer or an electrically conducting metal oxide.

27. The liquid crystal switching device of claim 20, wherein the second surface comprises a semiconducting material or a non-electrically conducting material.

28. The liquid crystal switching device of claim 1, wherein the first surface comprises at least one electrically conducting region, and further wherein the at least one electrically conducting region of the first surface provides a first working electrode, the liquid crystal device further comprising a counter electrode comprising an electrically conducting material.

29. The liquid crystal switching device of claim 28, wherein the counter electrode is disposed on the first surface of the first substrate.

30. The liquid crystal switching device of claim 29, wherein the first surface comprises at least a second electrically conducting region, and further wherein the second electrically conducting region provides a second working electrode, and still further wherein a redox-active material comprising at least one redox-active group is disposed on the second working electrode.

31. A method of changing the orientation of a liquid crystal in a liquid crystal switching device, comprising: oxidizing or reducing redox-active groups in a liquid crystal switching device, wherein the liquid crystal switching device comprises:
(a) a first substrate having a first surface;
(b) a redox-active material disposed on at least a portion of the first surface of the first substrate, the redox-active material comprising the redox-active groups;
(c) a liquid crystal disposed above the redox active material; and
(d) a salt dispersed in the liquid crystal,
wherein the orientation of the liquid crystal in the liquid crystal switching device is changed when the redox-active groups are oxidized or reduced.

32. The method of claim 31, wherein the first surface comprises at least one electrically conducting region, and further wherein the at least one electrically conducting region of the first surface provides a first working electrode and further wherein the liquid crystal device further comprises a counter electrode comprising an electrically conducting material.

33. The method of claim 32, wherein the redox-active groups are oxidized or reduced by applying an electric potential to the working electrode or the counter electrode.

34. The method of claim 33, wherein the electric potential is applied to the working electrode and further wherein the electric potential is less than 350 mV relative to the counter electrode.

35. The method of claim 31, wherein an oxidizing agent or a redox mediator is dispersed in the liquid crystal and the redox-active groups are oxidized or reduced by exposing the redox-active groups to the oxidizing agent or the redox mediator.

36. A method of manufacturing a liquid crystal switching device comprising:
(a) depositing a material having one or more redox-active groups on a surface of a substrate;
(b) disposing a liquid crystal over the material having the redox-active groups; and
(c) dispersing a salt in the liquid crystal.

37. The method of claim 36, wherein the salt is dispersed in the liquid crystal before the liquid crystal is disposed over the material having the redox-active groups.

38. A kit for manufacturing a liquid crystal device comprising:
(a) a substrate having a surface;
(b) a material comprising one or more redox-active groups;
(c) a liquid crystal; and
(d) a salt.

* * * * *